US005966496A

United States Patent [19]
Takimoto

[11] Patent Number: 5,966,496
[45] Date of Patent: *Oct. 12, 1999

[54] METHOD OF AND APPARATUS FOR RECORDING AND REPRODUCING DIGITAL INFORMATION SIGNAL INCLUDING SUB-INFORMATION

[75] Inventor: Hiroyuki Takimoto, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/862,523

[22] Filed: May 23, 1997

Related U.S. Application Data

[63] Continuation of application No. 08/420,442, Apr. 10, 1995, abandoned, which is a continuation of application No. 08/082,281, Jun. 24, 1993, abandoned.

[30] Foreign Application Priority Data

Jun. 29, 1992 [JP] Japan .................................. 4-171090

[51] Int. Cl.[6] .................................................. H04N 5/91
[52] U.S. Cl. ............................... 386/95; 386/52; 386/109
[58] Field of Search .................................. 360/19.1, 33.1, 360/32, 27, 22; 358/343, 311; 386/95, 52, 123, 124, 109, 112

[56] References Cited

U.S. PATENT DOCUMENTS

| 4,583,132 | 4/1986  | Nakano et al. ...................... 360/19.1 |
| 4,663,673 | 5/1987  | Doutsubo .............................. 360/27 X |
| 4,786,986 | 11/1988 | Yamanushi et al. .................. 360/27 X |
| 4,809,087 | 2/1989  | Shimeki et al. ...................... 360/27 X |
| 4,849,817 | 7/1989  | Short .................................. 358/311 X |
| 4,914,523 | 4/1990  | Maruta ..................................... 358/310 |
| 5,065,259 | 11/1991 | Kubota et al. ............................. 360/32 |
| 5,121,259 | 6/1992  | Yamashita ............................. 360/19.1 |
| 5,414,570 | 5/1995  | Fry et al. ................................. 360/48 |
| 5,499,145 | 3/1996  | Azuma et al. ................... 360/73.04 X |

Primary Examiner—Andrew L. Sniezek
Attorney, Agent, or Firm—Robin, Blecker & Daley

[57] ABSTRACT

There is provided a digital information signal recording and reproducing apparatus which is arranged to input a plurality of kinds of digital video signals, generate sub-information indicative of a television system of the digital video signal, and form a track on a recording medium to record the digital video signal and the sub-information related to the digital video signal at predetermined locations on the track, respectively.

16 Claims, 21 Drawing Sheets

METHOD OF AND APPARATUS FOR RECORDING AND REPRODUCING DIGITAL INFORMATION SIGNAL INCLUDING SUB-INFORMATION

This is a continuation application under 37 CFR 1.62 of prior application Ser. No. 08/420,442, filed Apr. 10, 1995, now abandoned which is a continuation of prior application Ser. No. 08/082,281 filed Jun. 24, 1993 now abandoned.

BACKGROUND OF THE INVENTION

1. Field of the Invention

The present invention relates to a method of and an apparatus for recording and reproducing information such as video information and, more particularly, to discrimination information (hereinafter referred to as "sub-information") which is recorded together with main information such as video/audio information and which is related to the processing of recording and reproducing the main information.

2. Description of the Related Art

In the D2 format which has heretofore been known as one digital VTR format, three tracks are defined at a predetermined location along the length of a tape so that sub-information is recorded on the three tracks by a fixed head different from a head provided on a helical scan type drum for recording and reproducing main information including a video information signal and an audio information signal.

The three tracks are a cue track for realizing a cueing function or the like, a time-code track for time information, and a control track on which signals are recorded such as a video frame pulse and an audio frame pulse.

However, in the above-described conventional example, since it is necessary to mount fixed heads (for recording, reproduction and erasure) at predetermined locations on a tape path with a predetermined accuracy, it is difficult to reduce the size and price of digital VTRs.

Furthermore, since the three tracks occupy a large area in a tape space, no tape can be economically used.

In addition, since no satisfactory sub-information can be obtained from only the above-described time information, video frame pulse and audio frame pulse or the like, it is necessary to consider the arrangement of the tracks and the contents of the sub-information for domestic-use digital VTRs which will become popular in future.

SUMMARY OF THE INVENTION

It is, therefore, an object of the present invention to provide a digital information recording and reproducing apparatus which makes it possible to solve the above-described problems involved in the conventional recording and reproducing apparatus and which can achieve reduction in size and price.

To achieve the above object, in accordance with one aspect of the present invention, there is provided a digital signal recording apparatus which comprises external input means for inputting a plurality of kinds of digital video signals, sub-information generating means for generating digital sub-information related to a digital video signal inputted from the external input means, and recording means for forming a track on a recording medium and recording the digital video signal and the digital sub-information related to the digital video signal at predetermined locations on the track, respectively, the digital sub-information including a signal indicative of a television system of the digital video signal.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

A digital VTR according to preferred embodiments of the present invention will be described below in detail with reference to the accompanying drawings.

Figure 1:
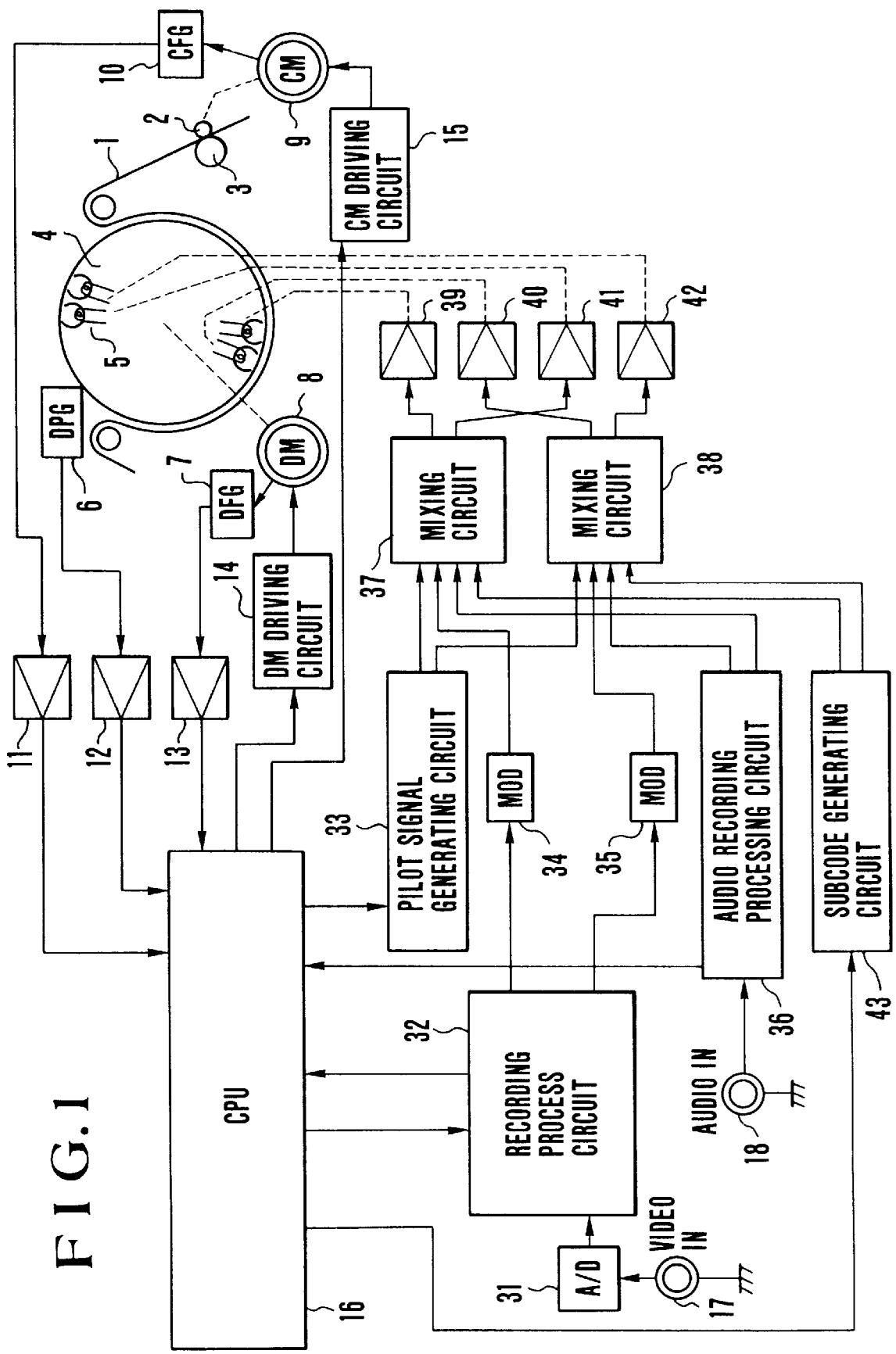
FIG. 1 is a block diagram showing a recording system of a digital VTR according to preferred embodiments of the present invention.
Figure 2:
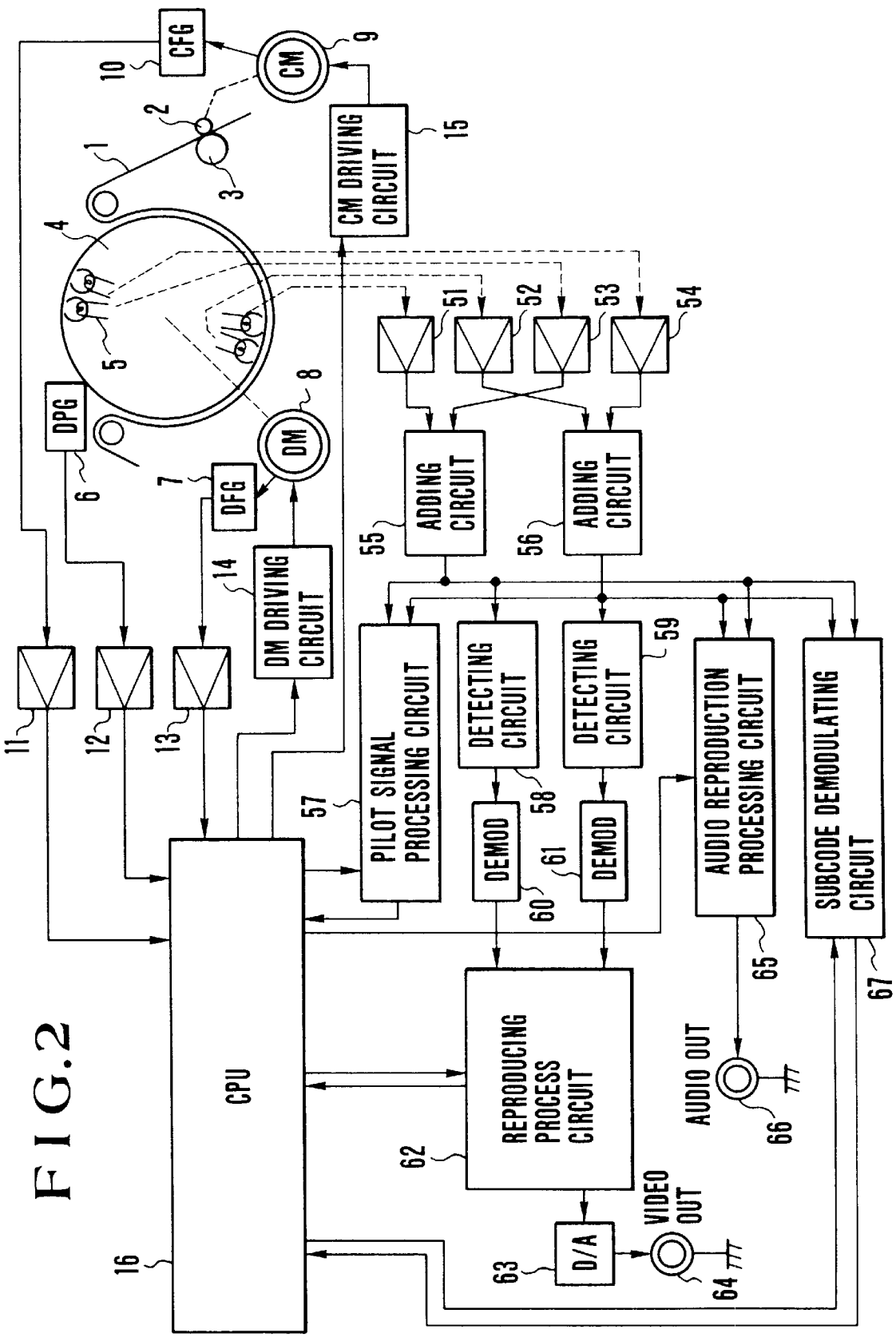
FIG. 2 is a block diagram showing a reproducing system of the digital VTR according to the preferred embodiments of the present invention.

FIGS. 1 and 2 are block diagrams showing the arrangement of the digital VTR according to the preferred embodiments of the present invention, and FIGS. 1 and 2 show the recording and reproducing systems of the digital VTR, respectively. In FIG. 2, the same reference numerals are used to denote parts which are identical or similar to those shown in FIG. 1, and description thereof is omitted for the sake of simplicity.

In FIG. 1, reference numeral 1 denotes a magnetic tape on which image information or the like is to be recorded. The arrangement shown in FIG. 1 includes a capstan 2, a pinch roller 3, a helical scan drum 4, a plurality of recording/reproducing heads 5 mounted on the helical scan drum 4, a PG (Pulse Generator) sensor 6 for detecting the rotational phase of the helical scan drum 4, a DFG (Drum Frequency Generator) sensor 7 for detecting the rotational speed of a drum motor 8, a capstan motor 9 coupled to the capstan 2, and a CFG (Capstan Frequency Generator) sensor 10 for detecting the rotation of the capstan motor 9.

The arrangement shown in FIG. 1 also includes amplifying circuits 11, 12 and 13 for amplifying signals supplied from the CFG circuit 10, the PG sensor 6 and the DFG sensor 7, respectively, a driving circuit 14 for the drum motor 8, a driving circuit 15 for the capstan motor 9, and a central control circuit (hereinafter referred to as the "CPU") 16 for executing control which will be described later.

The shown arrangement also includes an external input terminal 17 for a video signal, an external input terminal 18 for an audio signal, an A/D converter 31 for converting the video signal inputted through the external input terminal 17 into a digital signal, a recording process circuit 32 for subjecting the video signal digitized by the A/D converter 31 to predetermined processings such as a predetermined compression processing, an error correcting processing and a time-base processing conforming to a track format, a pilot signal generating circuit 33 for providing a tracking signal during reproduction, modulating circuits 34 and 35 for modulating signals supplied from the recording process circuit 32 into a form suitable for magnetic recording, an audio recording processing circuit 36 for subjecting an audio signal inputted through the external input terminal 18 to a signal processing according to the recording format thereof similarly to the video signal, and mixing circuits 37 and 38 for mixing the video information signal, the audio information signal and the pilot signal, which have been subjected to the above-described respective processings for recording, as well as subcode signals to be described later, thereby preparing mixed signals which can be recorded by the individual recording/reproducing heads 5.

The shown arrangement also includes recording amplifiers 39, 40, 41 and 42 for amplifying signals to be respectively recorded by the recording/reproducing heads 5 (in the present embodiments, the number of the recording/reproducing heads 5 is four).

The shown arrangement also includes a subcode generating circuit 43 for generating a subcode which will be described later in accordance with an instruction given by the CPU 16.

The arrangement shown in FIG. 2 includes reproducing amplifiers 51, 52, 53 and 54 for amplifying signals reproduced by the respective recording/reproducing heads 5, an adding circuit 55 for converting signals outputted from the reproducing amplifiers 51 and 53 into a predetermined signal, an adding circuit 56 for converting signals outputted from the reproducing amplifiers 52 and 54 into a predetermined signal, a pilot signal processing circuit 57 for outputting a signal corresponding to the amount of tracking error to the CPU 16 by processing pilot signals for tracking which are respectively contained in the signals outputted from the adding circuits 55 and 56, detecting circuits 58 and 59 for detecting video information signals from the signals outputted from the respective adding circuits 55 and 56, demodulating circuits 60 and 61 for demodulating the modulated video information signals outputted from the respective detecting circuits 58 and 59, a reproducing process circuit 62 for executing predetermined reproduction processings such as expansion of an error-corrected and compressed video signal, a D/A converter 63 for converting a digital video signal outputted from the reproducing process circuit 62 into an analog video signal, and an external output terminal 64 for the analog video signal.

The arrangement shown in FIG. 2 also includes an audio signal processing circuit 65 for executing a predetermined processing for demodulating an audio signal in a manner similar to that used for the demodulation of the video signals, and an external output terminal 66 for the demodulated audio signal.

The shown arrangement also includes a subcode demodulating circuit 67 for detecting the subcode signal which will be described later from the reproduced signals and outputting predetermined information to the CPU 16.

The CPU 16 changes the processing mode of each of the reproducing process circuit 62 and the audio signal processing circuit 65 or controls the speed of the magnetic tape 1.

Figure 3:
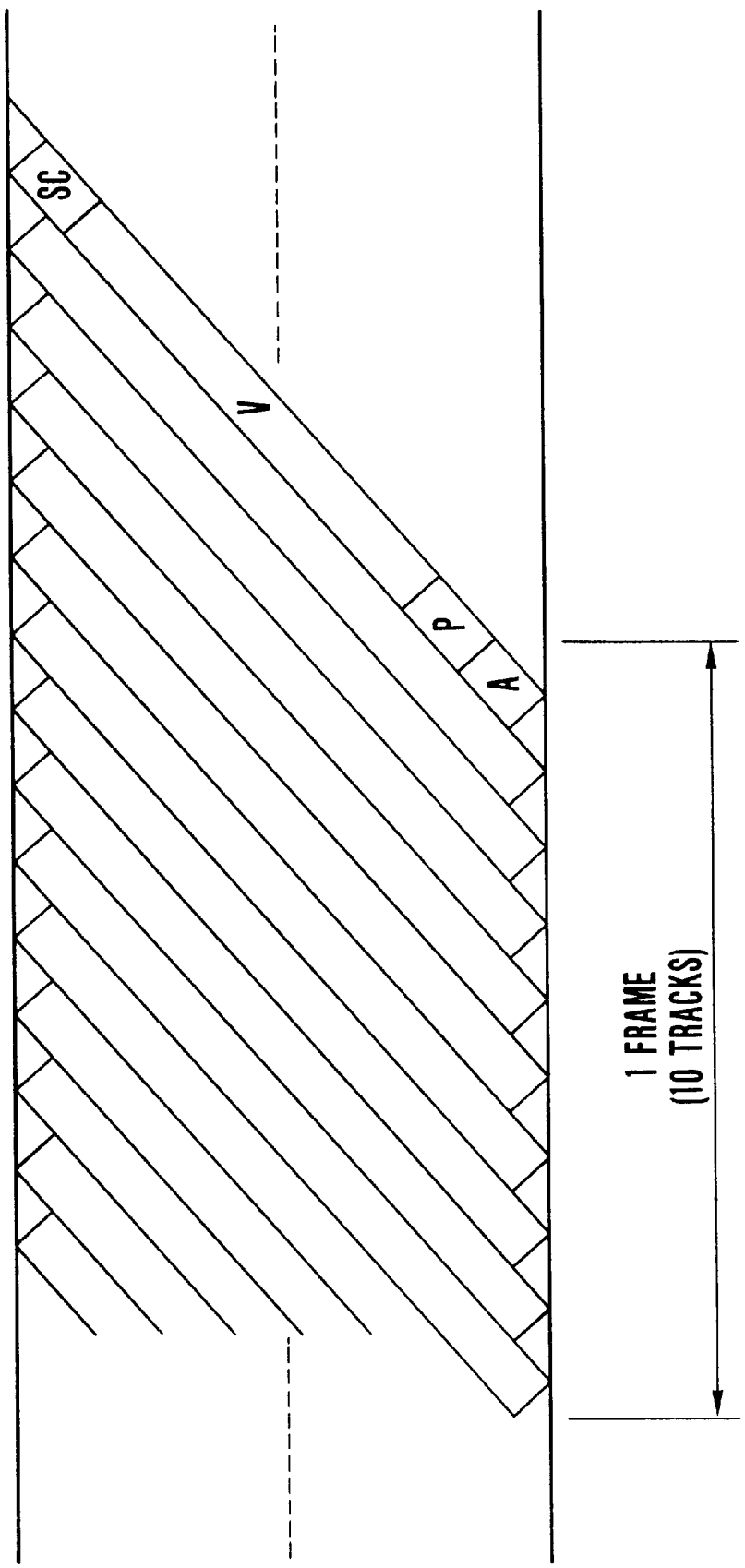
FIG. 3 is a schematic view which serves to explain a recording format on a tape according to the preferred embodiments.

FIG. 3 is a view schematically showing one example of a recording format for the magnetic tape 1.

The recording format shown in FIG. 3 includes an area A for recording an audio information digital signal, an area P for recording a pilot signal, an area V for recording a video information digital signal, and an area SC for recording a subcode signal.

In the recording format shown in FIG. 3, ten tracks are required to record an NTSC video signal for one frame (1/30 sec).

The operation of the recording system will be described below with reference to FIG. 1.

In FIG. 1, a video signal conforming to a normal NTSC system is inputted through the external input terminal 17, and is then converted into a digital video signal by the A/D converter 31.

The digital video signal is inputted into the recording process circuit 32. The recording process circuit 32 performs conversion (compression) of the digital video signal into digital data with a predetermined transmission rate, and then performs coding including addition of error-correcting parity data, sync signal data and the like. Further, the recording process circuit 32 performs segmentation of the digital data and the time-base processing needed to record the digital data in a predetermined area on a track, on the basis of timing information supplied from the CPU 16. The recording process circuit 32 supplies the thus-processed digital data to each of the modulating circuits 34 and 35. The modulating circuits 34 and 35 respectively modulate their input digital signals into signals of a form suitable for recording on the basis of the aforesaid data, and output the modulated signals to the respective mixing circuits 37 and 38.

Each of the mixing circuits 37 and 38 mixes the input modulated signal with an audio information digital signal, a pilot signal and a subcode signal all of which will be described later, and the mixing circuit 37 outputs the mixed signal to the recording amplifiers 39 and 41, while the mixing circuit 38 outputs the mixed signal to the recording amplifiers 40 and 42.

The outputs from the recording amplifiers 39, 40, 41 and 42 are recorded on the magnetic tape 1 in the pattern shown in FIG. 3 by the recording/reproducing heads 5.

In the meantime, an audio signal is inputted through the external input terminal 18, and is then subjected to predetermined processings including A/D conversion which are similar to the above-described processings applied to the video signal, by the audio recording processing circuit 36.

Reproduction tracking error detecting systems are divided into two major kinds of systems aside from a fixed-head system: a system for multiplexing a pilot signal onto a main information signal and recording the multiplexed signal on each track including the video area V and a system for providing an area for a pilot signal in a portion of each track. In the present embodiments, the latter system is adopted whose track pattern is shown in FIG. 3.

The construction of the subcode area SC shown in FIG. 3 will be described below with reference to FIG. 4.

Figure 4:
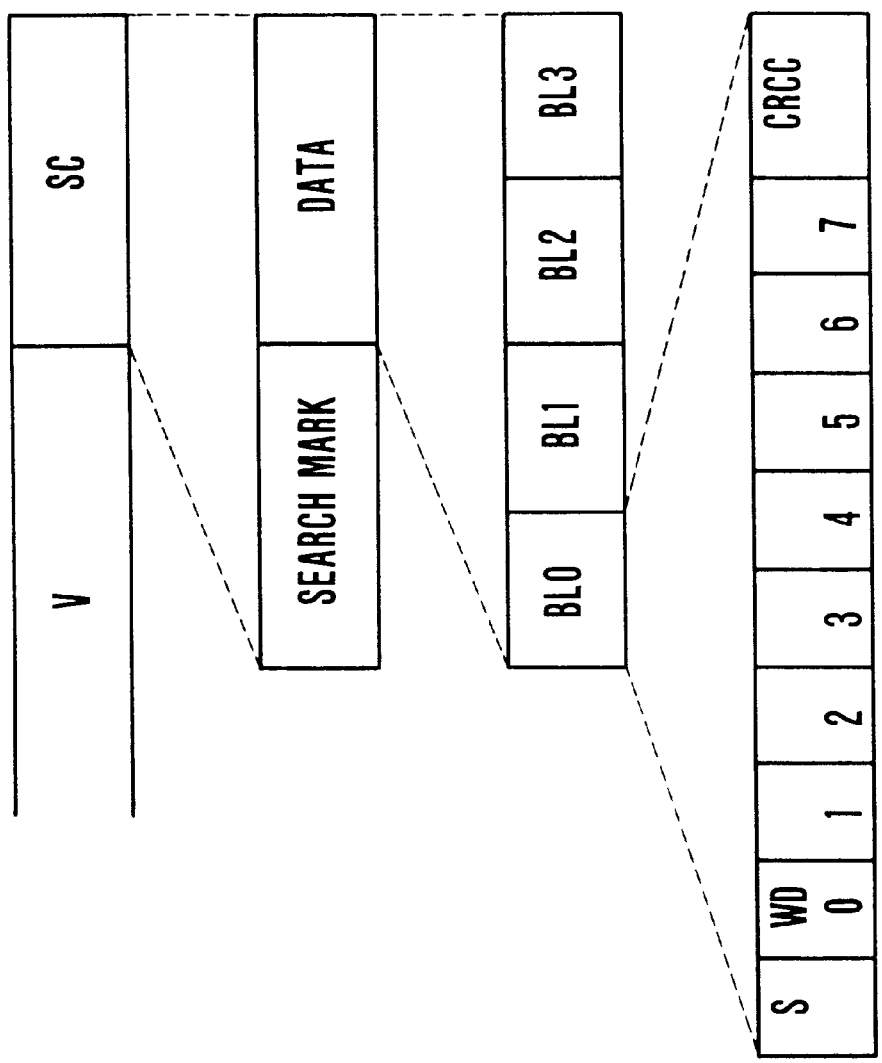
FIG. 4 is a schematic view which serves to explain a subcode area in a track on the tape shown in FIG. 3.

Referring to FIG. 4, the subcode area SC is divided into a data part and a search mark part for realizing a so-called cueing function.

The data part is made up of, for example, 4 blocks (BL0 to BL3), and each of the 4 blocks, for example, the block BL0, is made up of 8 words (WD0 to WD7), a sync code S and a CRCC part which is used for error correction.

Each of the words WD0 to WD7 is made up of 8-bit data.

The operation of the reproducing system will be described below with reference to FIG. 2.

Main information and sub-information recorded on the magnetic tape 1 is read out by the recording/reproducing heads 5 at a predetermined rotational speed of the helical scan drum 4 as well as a predetermined tape speed. The main information and the sub-information read out by each of the recording/reproducing heads 5 is amplified by a respective one of the reproducing amplifiers 51, 52, 53 and 54, and the outputs of the reproducing amplifiers 51 and 53 are formed into predetermined reproduced data by the adding circuit 55, whereas the outputs of the reproducing amplifiers 52 and 54 are formed into predetermined reproduced data by the adding circuit 56.

The tracking data recorded in the area P shown in FIG. 3 is converted into a tracking error signal by the pilot signal processing circuit 57, and the CPU 16 performs servo control on the basis of the tracking error signal, thereby providing optimum tracking.

The data recorded in the area V shown in FIG. 3 is converted into a video digital signal by the adding circuit 55 and the detecting circuit 58 or by the adding circuit 56 and the detecting circuit 59. The video digital signal is outputted from the detecting circuit 58 or 59 to the corresponding one of the demodulating circuits 60 and 61. The video digital signal demodulated by the demodulating circuit 60 or 61 is subjected to processings reverse to the above-described processings executed in the recording system, such as integration of segmented data, error correction and expansion, in the reproducing process circuit 62. The digital signal outputted from the reproducing process circuit 62 is converted into an analog video signal conforming to the normal NTSC system by the D/A converter 63.

In the meantime, the reproduced audio signal is processed by the audio signal processing circuit 65 similarly to the video signal.

Furthermore, the subcode reproduced from the area SC shown in FIG. 3 is applied to the subcode demodulating circuit 67 via the reproducing amplifier 51, 52, 53 or 54 and the adding circuit 55 or 56. The subcode is outputted from the subcode demodulating circuit 67 to the CPU 16 as information associated with various kinds of main information which will be described later.

The utilization of the sub-information which constitutes the gist of the present invention will be described in detail below.

A first embodiment in which the subcode is utilized for discrimination between recording modes will be described below.

As is well known, regarding each grade of magnetic tape, the quality of a recorded image is incompatible with an increase in recording time. Accordingly, it is desirable to provide a digital VTR for domestic use which is arranged to permit a user to select a desired recording mode from a plurality of recording modes as in the case of conventional VTRS. In a typical digital VTR, an increase in recording time is realized by changing the compression ratio of digital data.

Table 1 shows an example in which three kinds of recording modes are prepared as settable recording modes according to a format conforming to the NTSC system.

TABLE 1

Figure 5:
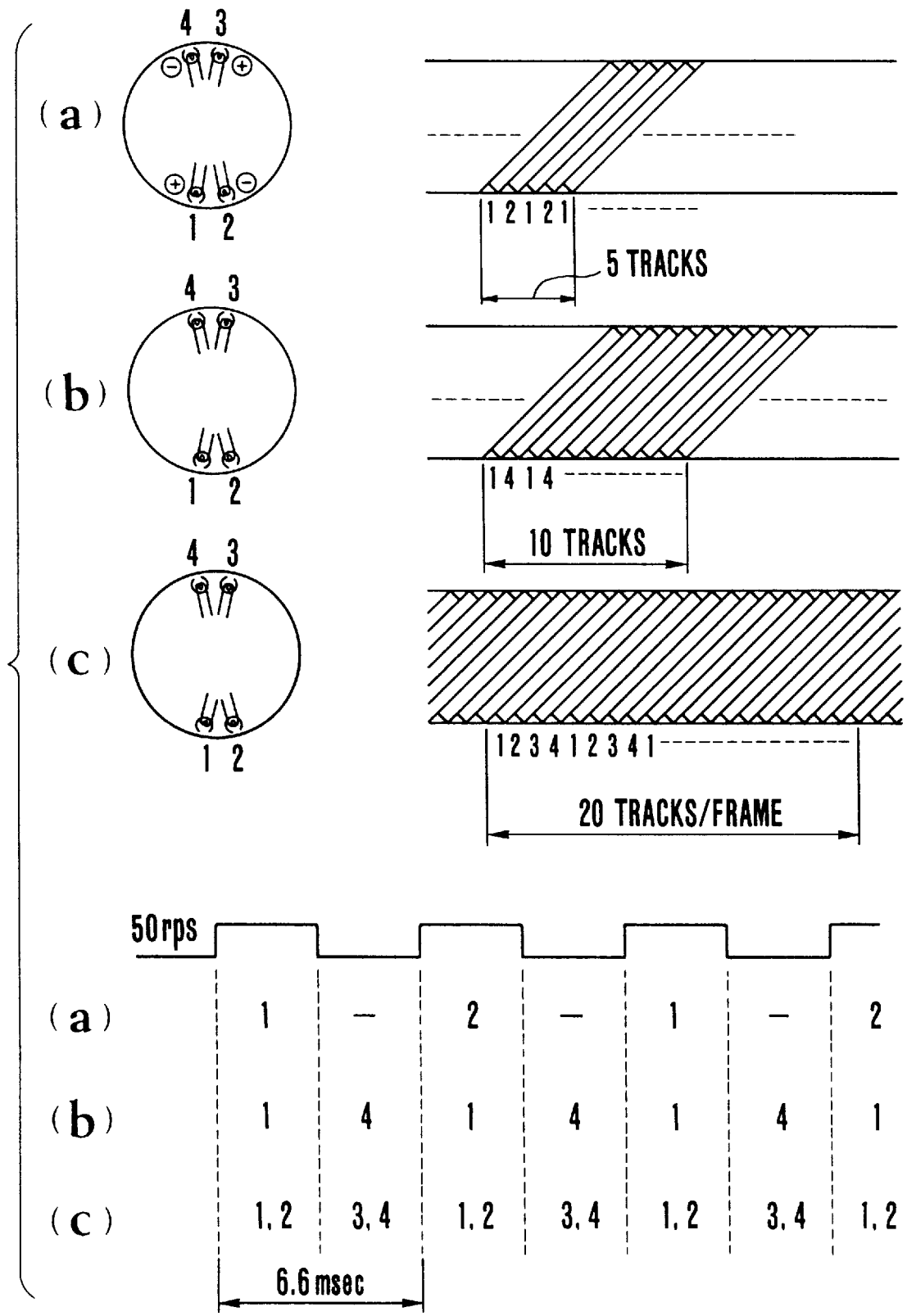
FIG. 5 diagrammatically shows track patterns according to individual recording modes according to the preferred embodiments of the present invention as well as the relationships between the recording modes, heads and a rotary drum.

| MODE | LP (Long Playback) | SP (Standard Playback) | HP (High-definition Playback) |
| --- | --- | --- | --- |
| TAPE SPEED | 7 mm/sec | 14 mm/sec | 28 mm/sec |
| NUMBER OF TRACKS/ FRAME | 5 | 10 | 20 |
| COMPRESSION RATIO | 1/10 | 1/5 | 1/2.5 |
| REFERENCE | (a) of FIG. 5 | (b) of FIG. 5 | (c) of FIG. 5 |

FIG. 5 diagrammatically shows track patterns according to the respective recording modes as well as the relationships between the recording modes and the kinds of heads used for the respective recording modes. FIG. 5 also includes a timing chart showing the timing of switching of recording heads for each of the recording modes.

In FIG. 5, "+" and "−" represent the azimuths of the heads. The rotational speed of a rotary drum is assumed to be 150 rotations per second (150 rps). In the LP mode, heads 1 and 2 are used to perform recording or reproduction; in the SP mode, the head 1 and a head 4; and in the HP mode, the heads 1, 2 and 3 as well as a head 4.

In a state where a tape is being reproduced at a tape speed different from that selected during recording, that is, in a state where the tape is being reproduced in a mode different from that selected during the recording, it is necessary to detect the kind of the mode and execute a mode change to correct the state of the reproduction.

If the tape is reproduced at a tape speed different from that selected during the recording, the inclination of tracks formed on the tape relatively differs from the inclination of head traces, so that the envelope waveform of the reproduction output is not of flat shape but of shape analogous to an array of a multiplicity of lozenges.

In a conventional type of analog VTR, since such an envelope waveform is detected to change the modes, predetermined filter means and detecting means are needed. Further, A/D converting means is also needed to execute a detecting algorithm.

Furthermore, the detecting algorithm is complicated and needs to be prepared in consideration of the presence of variations in the electromagnetic characteristics of individual tapes and heads as well as the track linearity of an individual mechanism.

To cope with the above-described problems, in the first embodiment, a signal for specifying a recording mode is written into the subcode area SC. For example, a signal indicative of "00"=SP, "01"=LP, "10"=HP or "11"= unrecorded is written into a predetermined word in a predetermined block of the subcode area SC.

Accordingly, even if a tape is being reproduced at a speed different from that selected during recording, a sufficient level of reproduction output can be obtained through at least one of the heads during one rotation of the rotary drum, so that it is possible to effect reading from the subcode area SC.

The thus-reproduced subcode signals are amplified by the respective reproducing amplifiers 51, 52, 53 and 54, and the respective outputs of the reproducing amplifiers 51 and 53 are mixed by the adding circuit 55, while the respective outputs of the reproducing amplifiers 52 and 54 are mixed by the adding circuit 56. The reproduced subcode signals thus mixed are inputted into the subcode demodulating circuit 67, in which a correctly reproduced subcode signal is selected from the input mixed subcode signals and is subjected to subcode demodulation. The subcode demodulating circuit 67 outputs the demodulated signal to the CPU 16.

The CPU 16 controls the tape speed in accordance with the signal outputted from the subcode demodulating circuit 67 so that a reproducing operation can be performed in a mode identical to that selected during recording.

As compared to the detecting system utilizing the envelope detection, the above-described method can achieve the following great advantages:

1) The scale of the entire circuit is small;

2) The tape speed can be reliably detected;

3) During reproduction, when head tracing advances from an unrecorded portion to a recorded portion, it is possible to make a quick decision as to the recording speed;

4) During reproduction, even if the head tracing advances from a portion recorded at one recording speed to a portion recorded at another recording speed, it is possible to quickly follow the variation of the recording speeds; and 5) It is possible to mechanically increase allowable values related to the track linearity, head characteristics and the like.

Also, the CPU 16 outputs information indicative of alteration of signal processing to the reproducing process circuit 62, in accordance with detected tape speed information.

In the case of the above 4), by temporarily outputting a still image, it is possible to realize tape-speed switching without occurrence of a visually offensive image.

Also, by temporarily muting an audio output, it is possible to prevent occurrence of noise.

Also, if a signal indicative of "11" is detected, it is determined that the head tracing has entered an unrecorded portion. In this case, if the tape feed is controlled at a tape speed faster than that selected in the HP mode, it is possible to quickly advance the tape to a recorded portion.

The operation of the reproducing process circuit 62 will be described below in detail with reference to FIGS. 6 and 7.

Figure 6:
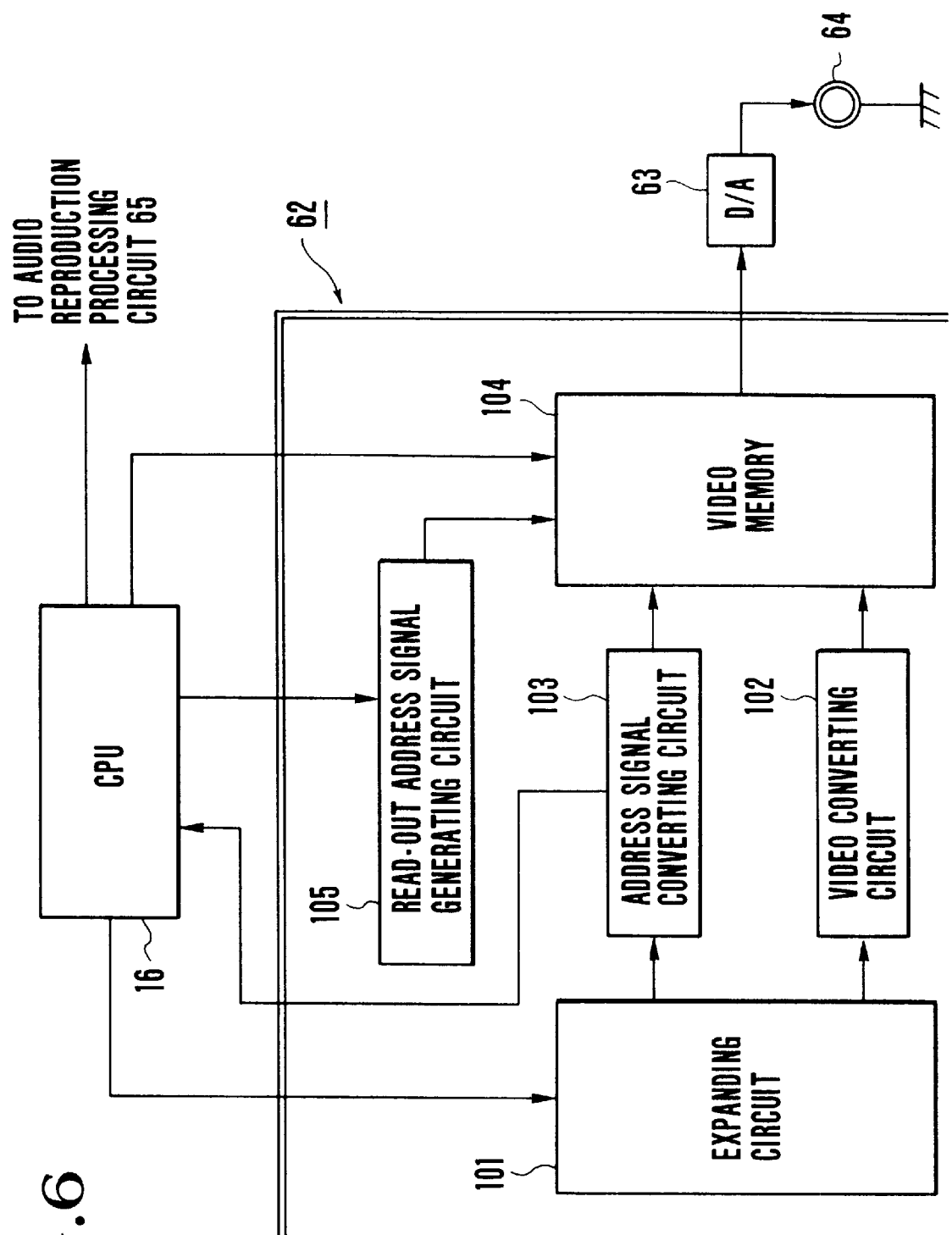
FIG. 6 is a block diagram serving to explain a first embodiment and showing the essential portions of a reproducing process circuit provided in the apparatus of FIG. 2.
Figure 7:
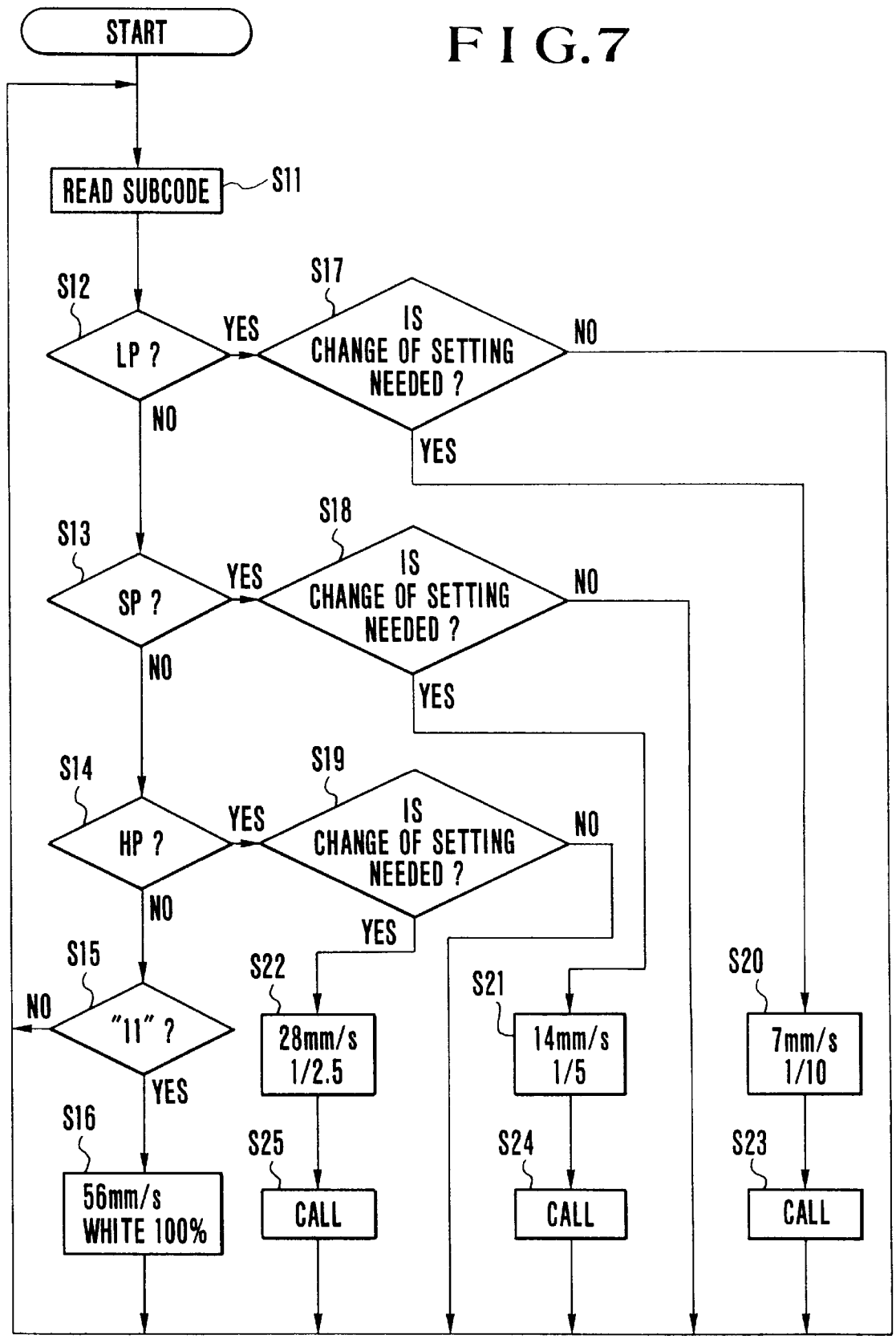
FIG. 7 is a flowchart which serves to explain a control operation according to the first embodiment.

FIG. 6 is a block diagram showing the essential portions of the reproducing process circuit 62 for performing the above-described control, and FIG. 7 is a flowchart of a reproducing-mode controlling operation. In FIG. 6, the same reference numerals are used to denote parts identical to those shown in FIG. 2, and description thereof is omitted.

The reproducing process circuit 62 shown in FIG. 6 includes an expanding circuit 101 for expanding a data signal compressed at a predetermined compression ratio during recording, a video converting circuit 102 for applying predetermined processing to a video digital signal outputted from the expanding circuit 101 and converting it to video data, an address signal converting circuit 103 for converting an address signal in correspondence with the video digital signal, and a video memory 104 into which data are written from the video converting circuit 102 in accordance with the address signal outputted from the address signal converting circuit 103.

The reproducing process circuit 62 also includes a read-out address signal generating circuit 105 for generating a read-out address for reading the video data from the video memory 104, on the basis of a timing signal outputted from the CPU 16.

The video memory 104 is capable of switching the state of storage of the video data between a rewritable state and a nonrewritable state in response to a signal supplied from the CPU 16.

The digital video signal read out from the video memory 104 is converted into an analog signal by the D/A converter 63, and the analog signal is outputted through the external output terminal 64.

Accordingly, when the CPU 16 inputs to the video memory 104 a signal for inhibiting rewriting of the video memory 104, a still-image reproduction state can be set irrespective of whether the tape is advancing.

Referring to the flowchart shown in FIG. 7, a subcode signal is first read out (Step S11).

Then, it is determined whether the reproduced subcode signal is any one of "00", "10", "01" and "11" (Steps S12, S13, S14 and S15).

If it is determined that the reproduced subcode signal is "11" (Step S15), the tape speed is set to a tape speed faster than that specified for the HP mode, for example, 56 mm/sec. Further, the reproducing process circuit 62 shown in FIG. 6 is controlled so that a video signal of white 100% is outputted (Step S16).

If a recorded portion appears during the tape scan, the reproduced subcode signal is read out (Step S11), and a decision is made as to the recording mode (LP, SP or HP) (Steps S12, S13 and S14).

In the case of the LP mode (Step S12), it is determined whether a change of settings such as the tape speed is needed (Step S17). If such a change is needed, the tape speed for the LP mode is set to 7 mm/sec and the CPU 16 transmits a control signal for specifying execution of an expansion processing corresponding to a predetermined compression ratio of 1/10 to the expanding circuit 101 of FIG. 6. If the change is not needed, the process returns to Step S11.

In the case of each of the SP mode (Step S13) and the HP mode (Step S14) as well, it is determined whether a change of settings such as the tape speed is needed (Steps S18 and S19). If such a change is needed, the change is performed (Steps S21 and S22). If the change is not needed, the process returns to Step S11.

The above-described change of the settings is such that the subcode changes from LP to SP in a particular part during, for example, the LP reproduction mode.

In this case, the tape speed is switched from 7 mm/sec to 14 mm/sec.

Further, the CPU 16 inputs a control signal to the expanding circuit 101 so that a reproduction processing corresponding to the recording processing performed in the SP mode is performed.

During reproduction of a tape on which image recordings are made at different speeds, if the reproducing speed of the tape is in a transition from one tape speed to another tape speed, no correct video digital information signal can be obtained from the tape and a visually extremely offensive picture is displayed.

Figure 8:
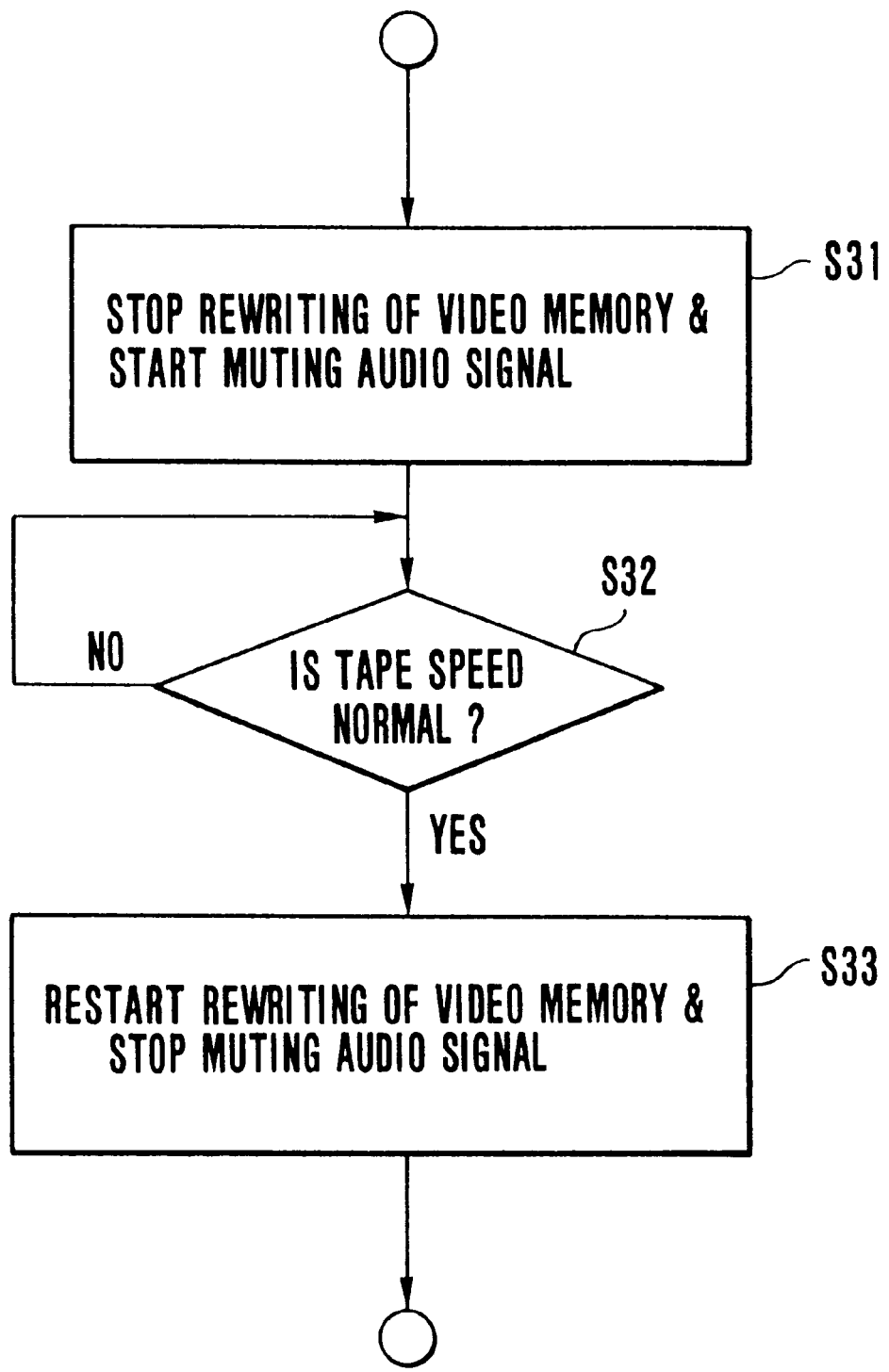
FIG. 8 is a flowchart which serves to explain the control operation according to the first embodiment.

Accordingly, if a change occurs in the tape speed, the processing shown in FIG. 8 is performed in Step S23, S24 or S25 after the change of the settings has been performed.

Referring to FIG. 8, if a change occurs in the tape speed, rewriting of data to the video memory 104 is inhibited.

Also, since no audio signal indicative of correct data is obtained, a control signal is inputted to the audio signal processing circuit 65 shown in FIG. 2 so that the audio output thereof is muted (Step S31).

After the change in the tape speed has occurred, if normal tracking for a new, correct tape speed is established and a signal indicating that reproduced digital data for a predetermined interval (one frame or several frames) has been obtained is inputted from the reproducing process circuit 62 to the CPU 16 (Step S32), rewriting of the data of the video memory 104 is restarted, and the muting of the audio signal output is cancelled (Step S33).

Accordingly, if a change in tape speed occurs, a picture immediately before the change is outputted as a still image until a normal picture is obtained after the change, so that it is possible to achieve switching which is not visually offensive. Therefore, no distorted sound is outputted and good switching can be realized.

A second embodiment of the present invention will be described below.

It is desirable to provide a format which encompasses an HD (High Definition) TV type video signal, in addition to recording and reproduction of an NTSC system video signal or a PAL system video signal.

The following description refers to a discrimination between the NTSC system (hereinafter referred to as the "HP mode") and the HDTV system (hereinafter referred to as the "HD mode"), and it is assumed that the NTSC system and the PAL system are normal systems relative to the HDTV system.

In the second embodiment, on the basis of, for example, the track pattern for the HP mode, a predetermined comparatively high compression, subsampling or the like is applied to an HDTV video signal, thereby effecting conversion to a transmission rate which allows for recording/reproduction of the HDTV video signal. The recording mode in which this recording operation is performed is hereinafter referred to as the "HD mode".

The number of horizontal (H) lines for the HD mode is 1125 H lines/frame, while the number of H lines for the NTSC system is 525 H lines/frame. The HP mode and the HD mode adopt different kinds of compression, error correction and shuffling.

Logical formats including a sync part, an ID part, a parity part and others also differ between the HP mode and the HD mode.

For this reason, during reproduction, in the reproducing process circuit 62, by determining which of the HP mode and the HD mode is selected, it is possible to alter a reproduced signal processing process. However, this method involves an increase in the scale of the entire circuit.

To overcome the above problem, a signal for discriminating between the recording of an NTSC signal and the recording of an HDTV signal is defined as a subcode.

For example, the recording of an NTSC signal is defined as "0", while the recording of an HDTV signal is defined as "1".

This HP or HD subcode signal is reproduced by the subcode demodulating circuit 67 of FIG. 2 and outputted to the CPU 16. The CPU 16 alters the reproduced signal processing process of the reproducing process circuit 62 in accordance with the output signal.

Accordingly, it is possible to extremely easily discriminate between the recording of an NTSC signal and the recording of an HDTV signal in a format capable of recording the HDTV signal.

A third embodiment of the present invention will be described below.

There are three modes of recording/reproduction of an audio signal: a monaural mode (hereinafter referred to as the "MON mode") for inputting an audio signal into one of an L (left) channel and an R (right) channel, i.e., the L channel; a stereophonic mode (hereinafter referred to as the "STE mode") for inputting stereophonic audio signals into the L channel and the R channel; and a bilingual mode (hereinafter referred to as the "BIL mode") for inputting a Japanese audio signal into either one of the L channel and the R channel and an English audio signal into the other.

It is difficult to discriminate among the three modes by using a reproduced audio information digital signal itself. To easily realize the discrimination, recording-mode information may be recorded in any one of the sync part, the parity part and the ID part of an audio area on each track.

According to this method, it is possible to realize highly reliable discrimination and control comparatively easily. However, it is necessary to provide the audio signal processing circuit 65 with a dedicated ID extracting circuit and a dedicated ID discriminating circuit.

If a subcode is employed, it is possible to achieve automatic switching of the above-described audio-signal reproduction modes without the need to add new hardware.

Figure 9:
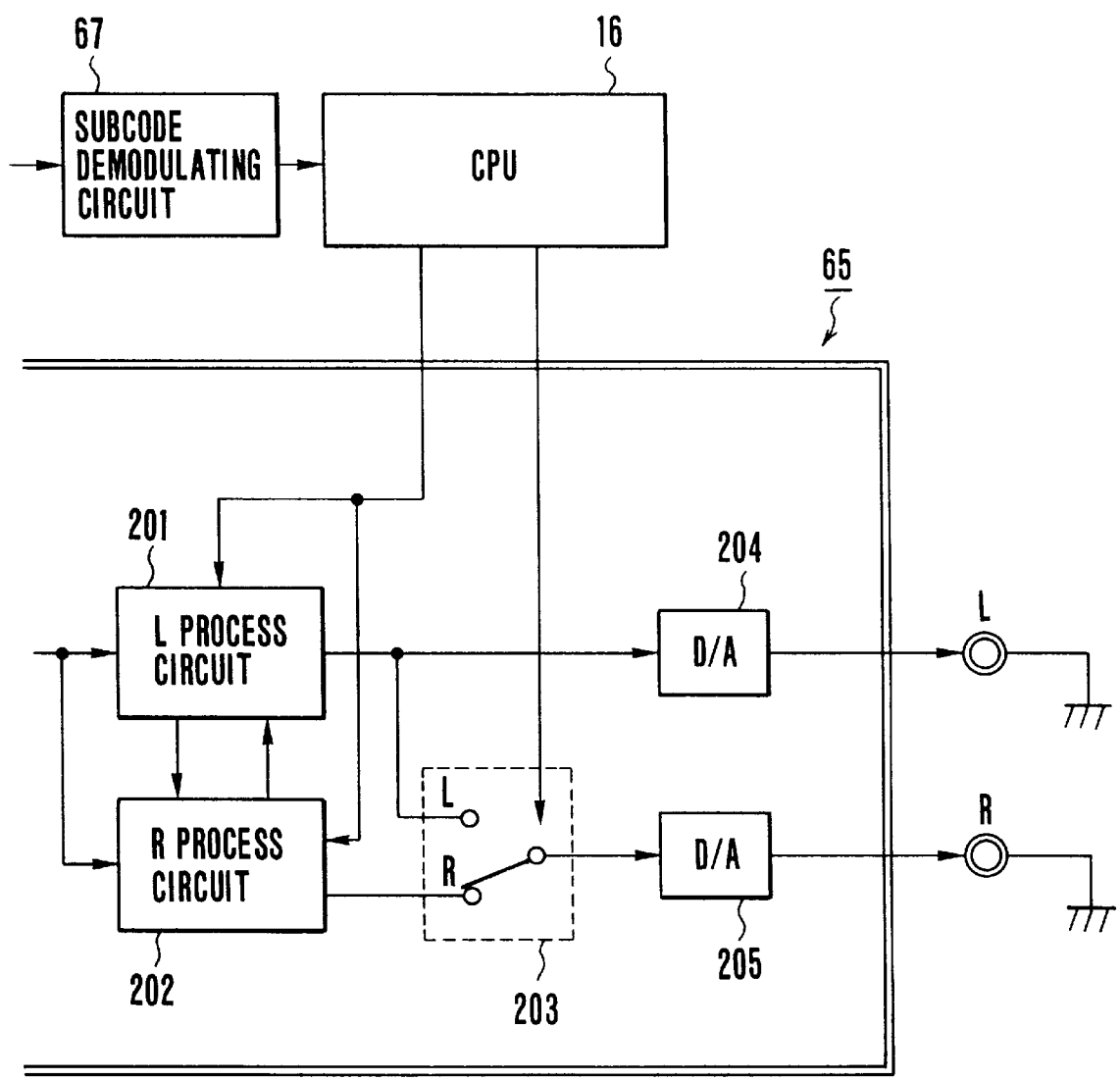
FIG. 9 is a block diagram serving to explain a third embodiment and showing the essential portions of an audio reproduction processing circuit provided in the apparatus of FIG. 2.

FIG. 9 is a block diagram showing a part of the audio signal processing circuit 65 according to the third embodiment. In FIG. 9, the same reference numerals are used to denote parts which are identical to those shown in FIG. 2, and description thereof is omitted.

The part shown in FIG. 9 includes an L process circuit 201 for obtaining an L-channel digital audio signal from a demodulated, time-division audio information digital signal by performing predetermined processings such as error correction and time-base processing, an R process circuit 202 for an R channel, a selecting switch 203, and D/A converters 204 and 205 for converting a digital audio signal into an analog audio signal.

In the third embodiment, at a predetermined bit of a predetermined word of a subcode signal, "11" is defined as "stereophonic recording", "10" as "bilingual recording" and "01" as "monaural recording".

Audio mode information carried by a reproduced subcode signal is inputted from the subcode demodulating circuit 67 into the CPU 16.

In the case of stereophonic recording, i.e., if the subcode is "11", the CPU 16 outputs a control signal to cause the selecting switch 203 to select its R side, whereby an L audio signal and an R audio signal are outputted from an output terminal L and an output terminal R respectively.

Figure 10:
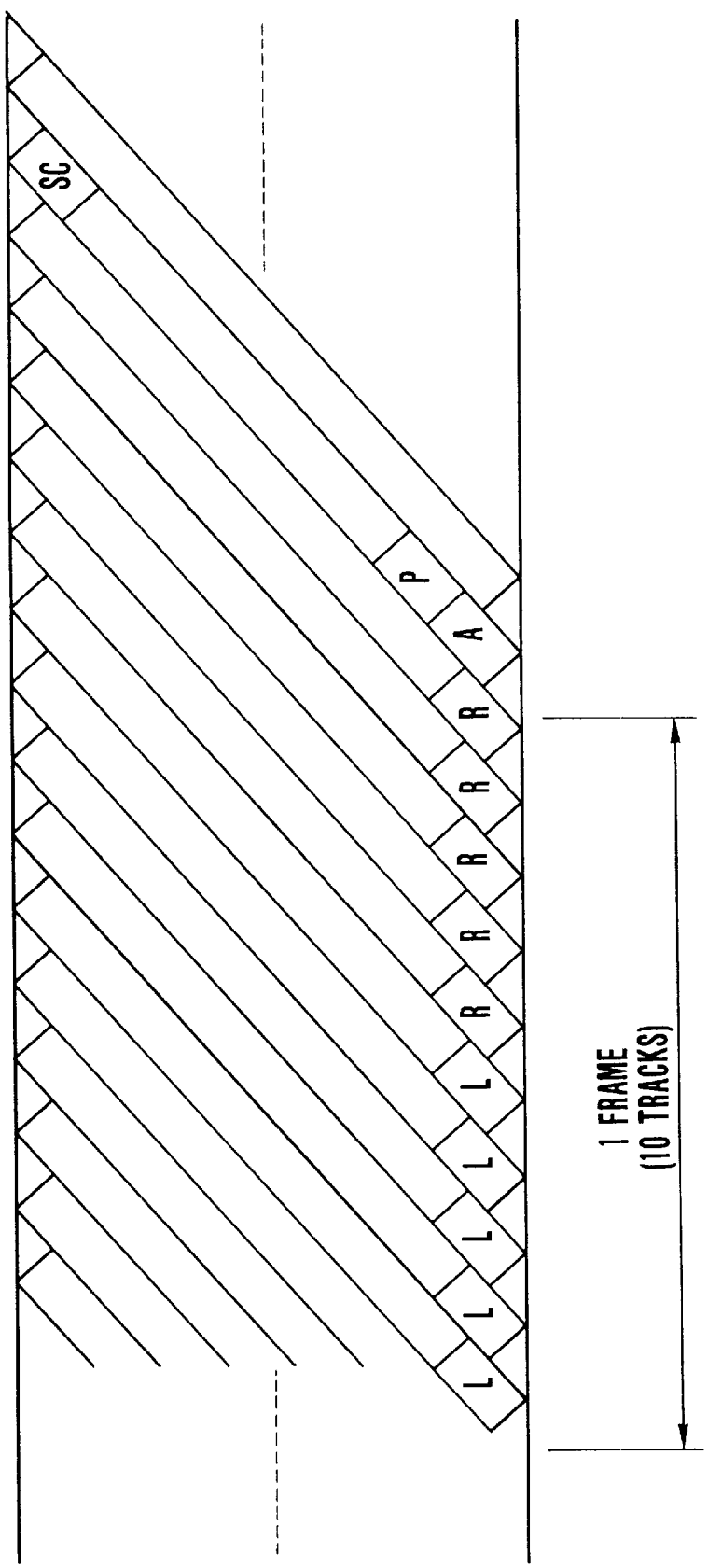
FIG. 10 is a schematic view which serves to explain a recording format according to the third embodiment.

One example of the track format of a video tape for the stereophonic recording is shown in FIG. 10.

Referring to the audio area of the shown track format, one frame consists of ten tracks, and an L-channel audio information digital signal is recorded over the first five tracks, while an R-channel audio information digital signal is recorded over the second five tracks.

Although each of the L-channel and R-channel audio information digital signals is error-corrected, an uncorrectable, large number of continuous errors may occur due to the occurrence of head clogs or the like. In this case, a temporary interpolation is possible by replacing only the data errors with corresponding data on the other channel.

The L process circuit 201 and the R process circuit 202 may also be provided with interpolation functions, respectively.

In the case of monaural recording, i.e., if the subcode is "01", the CPU 16 outputs a control signal to cause the selecting switch 203 to select its L side, whereby monaural audio signals are outputted from the output terminals L and R.

According to the track format, it is possible to record identical audio information digital signals on the first five tracks and the second five tracks of ten tracks, so that interpolation of an error due to a head clog or the like is possible in a manner similar to that used for the stereophonic mode.

In the case of bilingual recording, i.e., if the subcode is "10", the CPU 16 outputs a control signal to cause the selecting switch 203 to select the R side.

The L channel is defined as a main audio channel, while the R channel is defined as a sub-audio channel, and audio signals, which have been recorded and reproduced in a manner similar to that used for the stereophonic mode, are outputted from the output terminal L and the output terminal R, respectively.

At this time, the CPU 16 outputs a control signal to stop the L process circuit 201 and the R process circuit 202 from executing their data interpolating functions based on the detection of the head clog.

As described above, the modes of audio signal recording are respectively defined as the subcodes, whereby, during reproduction, it is possible to easily determine whether a recorded, audio information digital signal is monaural, stereophonic or bilingual. Accordingly, it is possible to obtain the audio signals for the respective modes by means of a simple device.

A fourth embodiment will be described below.

A VTR which is capable of recording and reproducing not only an NTSC-system video signal but also a PAL-system video signal is well known in the art. In such a VTR, for all reasons such as reliability and cost, it is desirable to perform recording and reproduction under common mechanical control in the case of either of the NTSC- and PAL-system video signals.

FIG. 3 shows one example of the track pattern of the NTSC-system video signal recording format. Although not shown, in a PAL-system video signal recording format according to the third embodiment, one frame is formed by twelve tracks, where conditions, such as tape speed and drum rotational speed, are identical to those of the NTSC-system video signal recording format.

To make it possible to determine, during reproduction, which format of signal is recorded on a tape, associated information may be recorded in the ID part or the like of a logical format. However, even if individual types of products have different targets, they have the common problem that reproduction of both formats of signals by a single arrangement is a significant burden from the viewpoint of cost and size.

For this reason, there is provided a VTR dedicated to the NTSC system or the PAL system.

Even in a VTR dedicated to either one system, to determine which format of signal is recorded on a tape, it is still necessary to reproduce video signal digital information and detect an ID part in the reproduced information. Further, it is necessary to prepare various processings such as error correction, shuffling and time-base processing compatibly with both systems, so that hardware and software become complicated.

If such a dedicated VTR is designed so as not to make a decision as to the NTSC system or the PAL system, it is impossible to inform a user of the reason why a tape is not reproduced.

However, if a subcode is employed, it is possible to effect the aforesaid decision by simple software without increasing the scale of the hardware.

Regarding audio signals, recording and reproduction can be effected in accordance with a format and a signal processing which are common to both systems.

Accordingly, it is possible to provide a dedicated VTR in which if a tape recorded according to a system different from the system supported by the VTR is reproduced, the television system of the recorded tape is identified on the basis of the subcode and the user is informed by an LED or the like that reproduction of a video signal from the tape is impossible because of the difference in television system. Meanwhile, it is also possible to continue reproduction of only an audio signal. Accordingly, the fourth embodiment is convenient for the user since he or she can simply know the contents of the recorded tape.

A fifth embodiment will be described below.

In the present invention, in any of the illustrated plurality of formats such as the LP, SP and HP modes, if a recording of track numbers (hereinafter referred to as the "TNo(s).") in one frame is defined as a subcode, controllability which will be described later is improved.

In a VTR, if a mode change from still reproduction to normal reproduction is to be performed, a capstan motor is driven and its rotational speed increases until a predetermined tape speed is reached. At this point in time, if a video head is placed at a timing location immediately before it starts to scan the first track of one frame, the first track can be reproduced immediately and the subsequent video tracks can be correctly reproduced without occurrence of an off-track or the like. Further, it is possible to prevent a disturbance of an image reproduced during the mode change from still reproduction to normal reproduction.

To realize such control, some methods are available, such as (1) a method in which, during a tape stopping operation, a tape is made to stop while targeting a predetermined track within one frame, and a capstan motor is started in synchronism with the rotational phase of a drum motor and (2) a method in which a tape is made to randomly stop, and according to the location where the tape is stopped (according to on which track in one frame the head tracing is stopped), the timing of starting the capstan motor is varied with respect to the rotational phase of the drum. In either method, it is convenient to obtain sub-information indicating on what numbered track in one frame the head tracing is stopped, since no addition of hardware is needed.

In the following description of the fifth embodiment, reference will be made to the above-described method (1).

Figure 11:
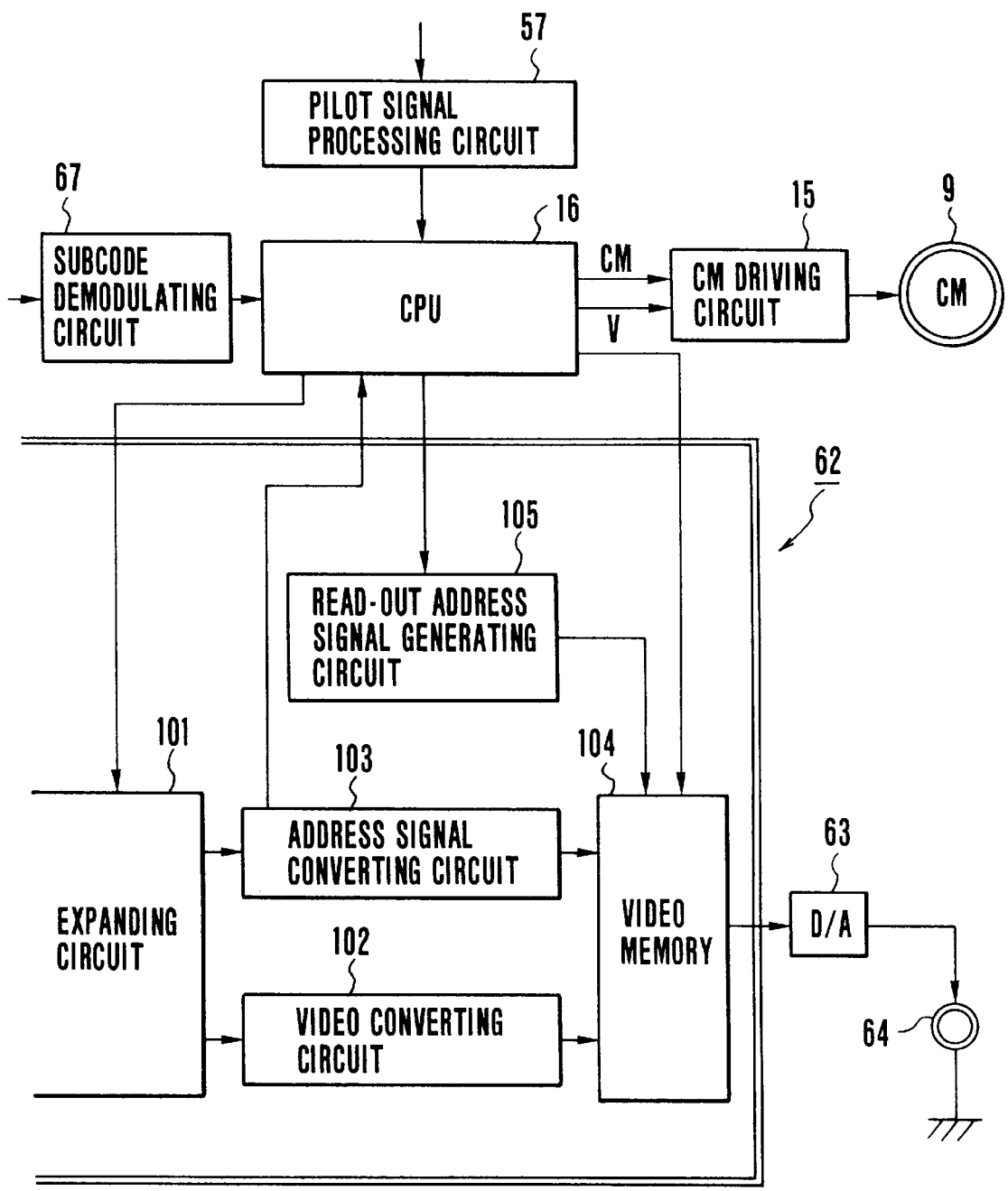
FIG. 11 is a block diagram serving to explain a fifth embodiment and showing the essential portions of the reproducing process circuit provided in the apparatus of FIG. 2.
Figure 12:
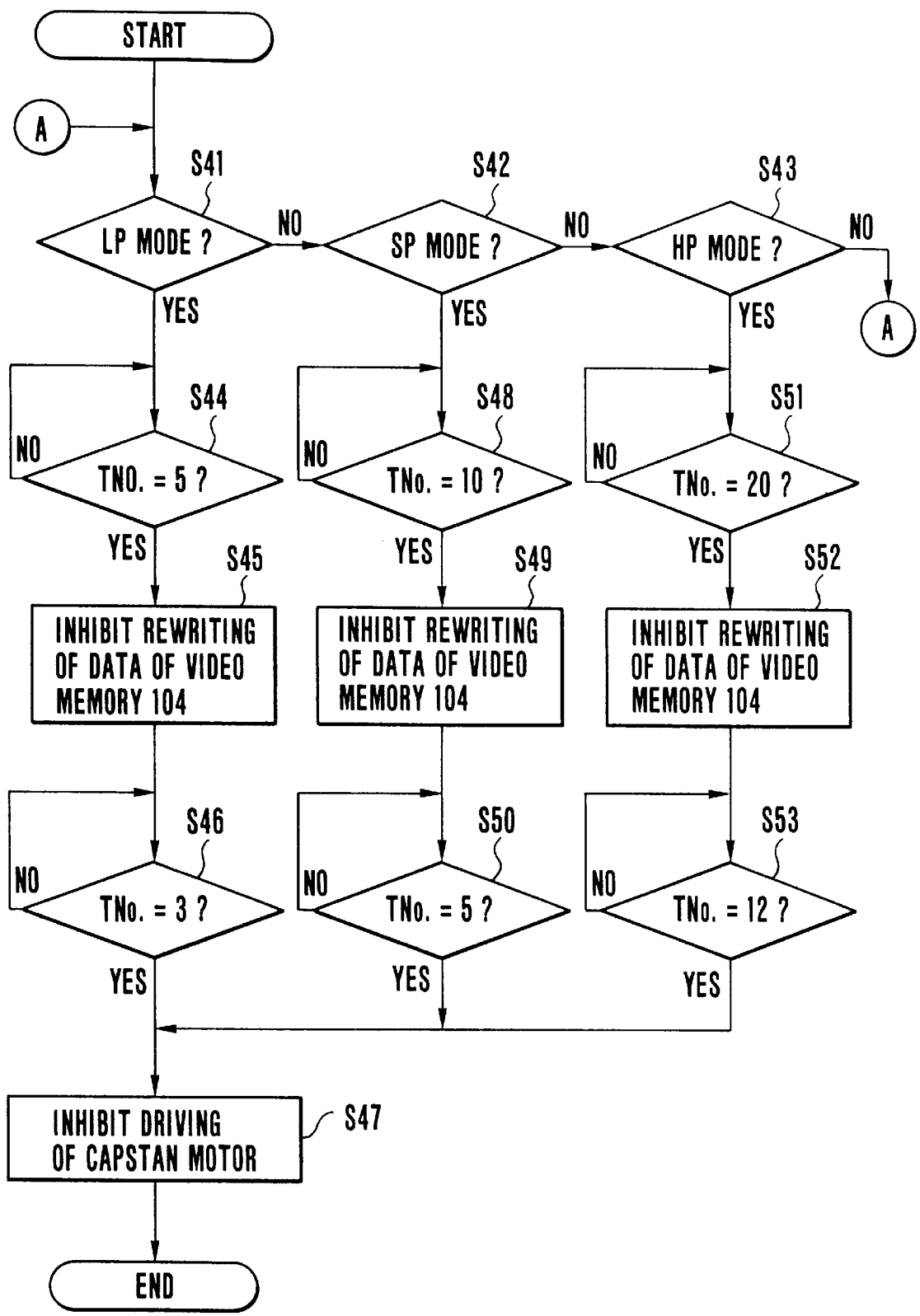
FIG. 12 is a flowchart showing the control operation (conforming to the NTSC system) of the fifth embodiment.

FIG. 11 is a block diagram showing the essential portions of the reproducing process circuit 62 for performing control according to the fifth embodiment, and FIG. 12 is a flowchart showing the operation of the fifth embodiment in the case where the arrangement shown in FIG. 11 supports the NTSC system. In FIG. 11, the same reference numerals are used to denote parts which are identical to those shown in FIGS. 1, 2 and 6, and description thereof is omitted.

The operation will be described below with reference to FIGS. 11 and 12.

Referring to FIG. 12, if a switch (not shown) for still reproduction is operated, the flow starts.

First, the kind of recording/reproduction mode is determined on the basis of a subcode (Step S41, S42 or S43).

If it is determined (Step S41) that an NTSC·LP mode is selected and that normal reproduction is being performed, after the head tracing has reproduced the last track (TNo. 5) in one frame (Step S44), the operation of writing new data into the video memory 104 is made to stop (Step S45). Reading from the video memory 104 is continued, and a still image is reproduced.

Then, the flow waits for TNo. 3 while causing a speed control signal v to be outputted to the capstan driving circuit 15 on the basis of a tracking error signal supplied from the pilot signal processing circuit 57 (Step S46).

If it is determined (Step S46) that TNo. 3 has been reproduced, an output signal CM for controlling the start and stop of the capstan motor 9 is set to its off level, thereby stopping the capstan motor 9 (Step S47).

It is to be noted that the track number (TNo. 3) at which the capstan motor 9 is made to stop is determined by the start-up characteristics or the like of the capstan motor 9. Specifically, account is taken into the time for which a tape travels by inertia after an instruction to stop the motor 9 has been executed, and the time required for the tape to reach a normal tape speed when the tape is again driven to perform normal reproduction. More specifically, if still-image reproduction is cancelled and the capstan motor 9 is started, the speed control signal v is outputted at a high voltage during the start-up of the capstan motor 9 by the operation of the speed control loop of the CPU 16 itself. Accordingly, TNo. is selected so that when the capstan motor 9 reaches a predetermined speed and the speed control signal v reaches a standard voltage, the head becomes able to trace the first track of the next frame to a frame which was traced by the head during the stop of the capstan motor 9.

Each of the SP and HP modes adopts substantially the same processing as the LP mode except for TNos. at which rewriting to the video memory 104 is executed (Steps S48 and S51) and TNos. at which an instruction to stop the capstan motor 9 is executed (Steps S50 and S58). Accordingly, description of the SP and HP modes is omitted.

Figure 13:
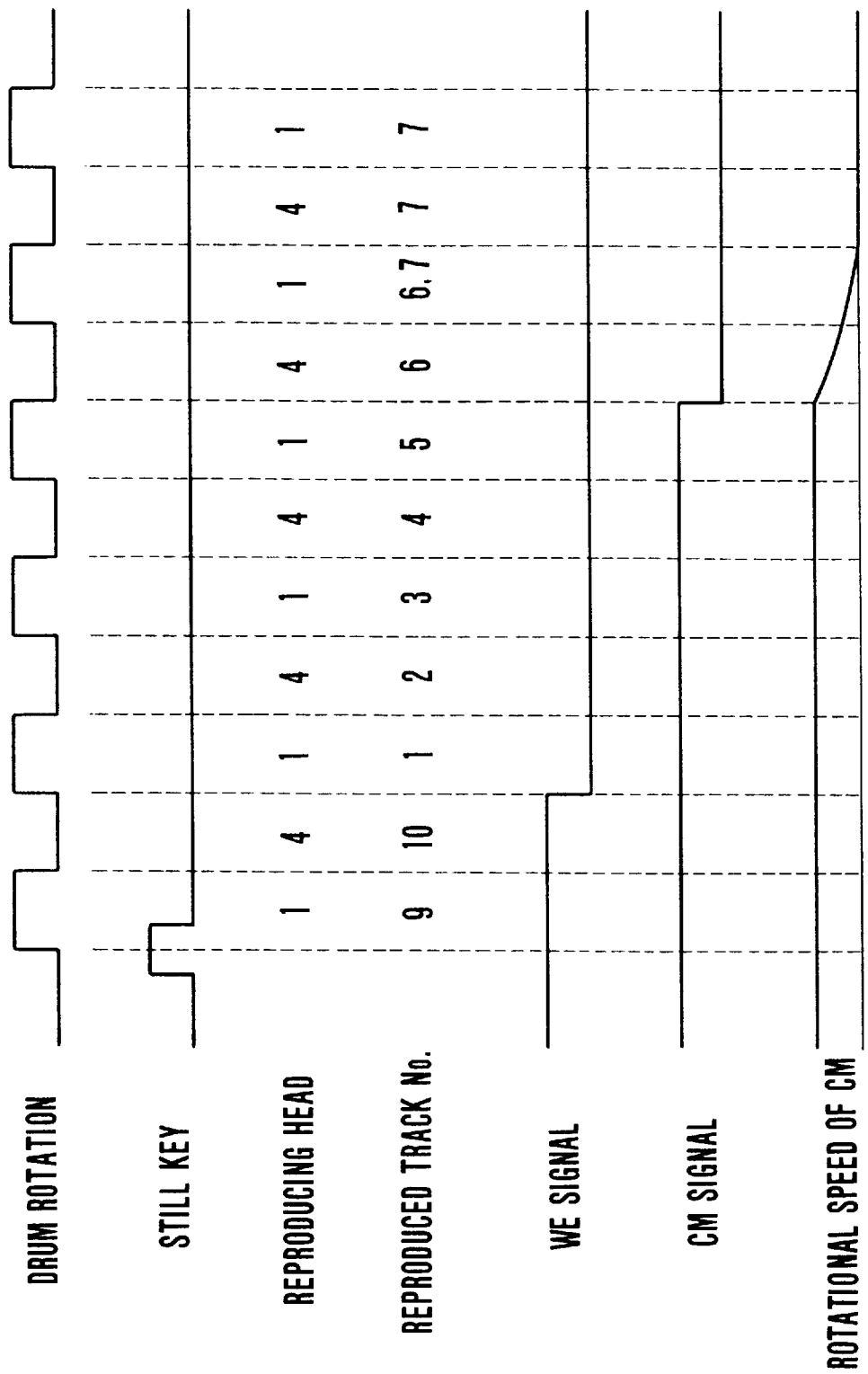
FIG. 13 is a timing chart which serves to explain the control operation of the fifth embodiment.
Figure 14:
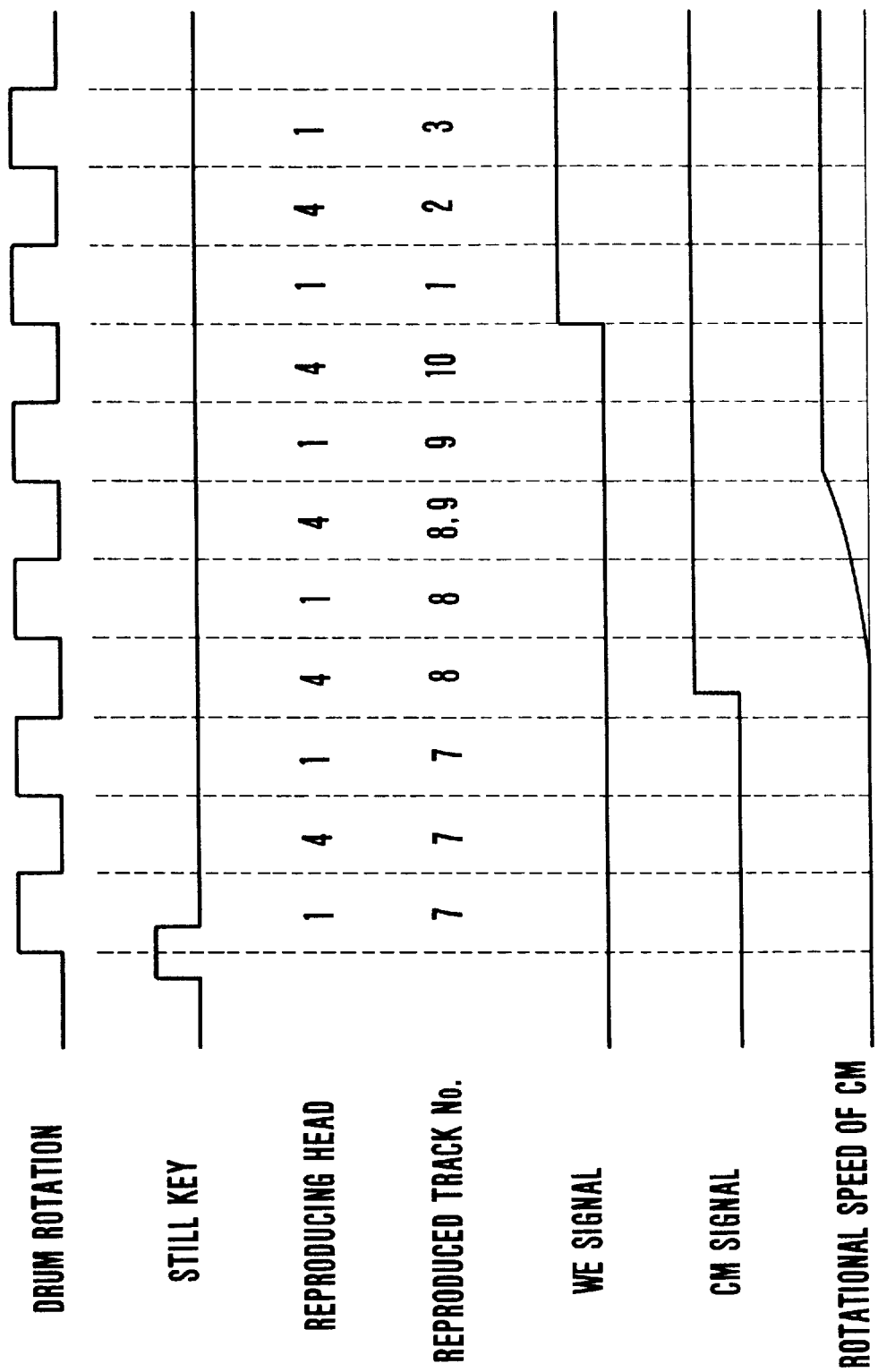
FIG. 14 is a timing chart which serves to explain the control operation of the fifth embodiment.

FIGS. 13 and 14 are timing charts showing the operation of one example of the fifth embodiment. FIG. 13 is a timing chart showing the process of shifting the mode of reproduction to a still-image reproduction mode during normal reproduction in the NTSC·SP mode by the operation of a switch (not shown), and FIG. 14 is a timing chart showing the process of cancelling the still-image reproduction mode and shifting the mode of reproduction to the normal reproduction.

Figure 15:
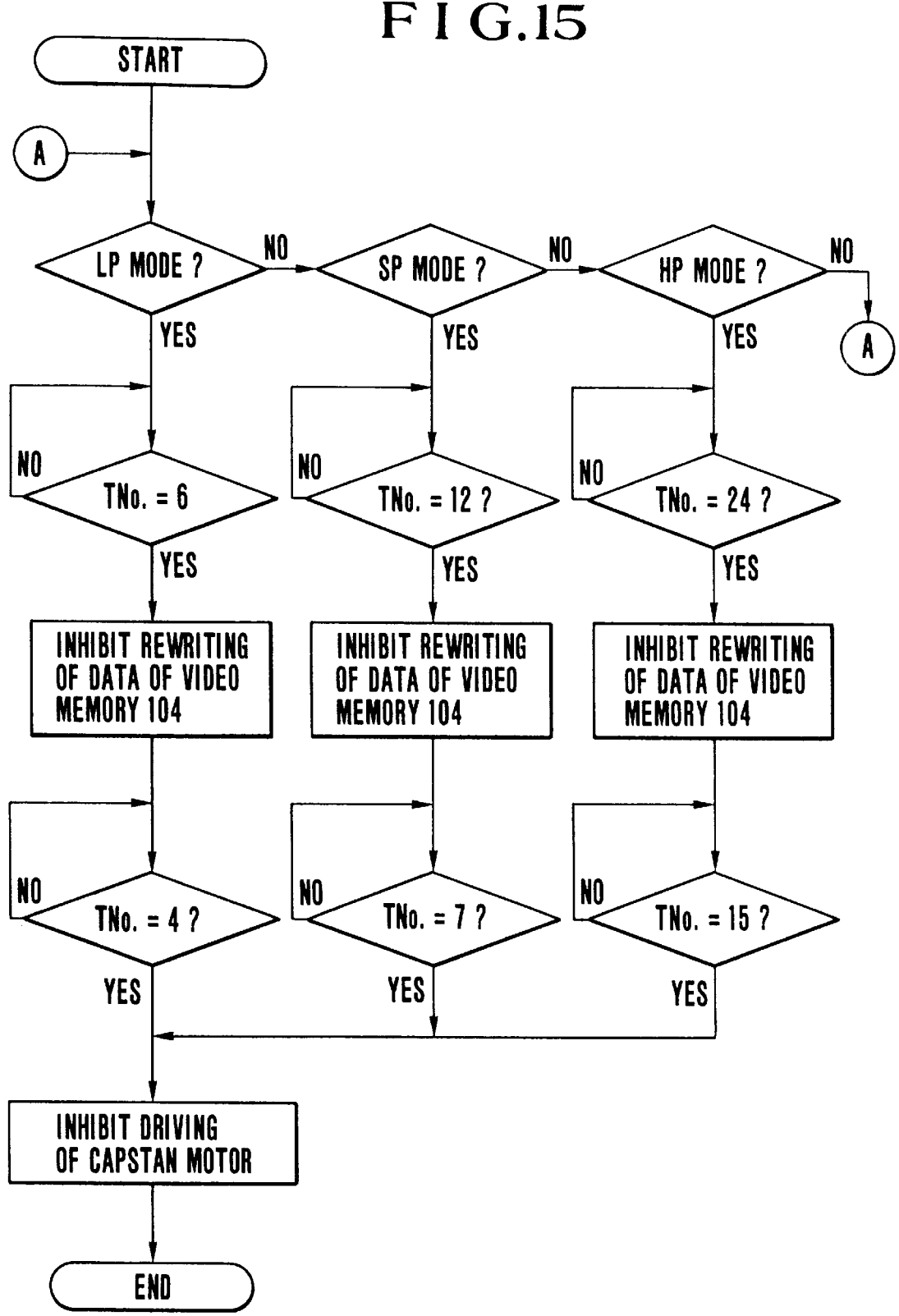
FIG. 15 is a flowchart showing the control operation (conforming to the PAL system) of the fifth embodiment.

FIG. 15 is a flowchart showing processing operations for the PAL system. The processing operations for the PAL system are substantially the same as those for the above-described NTSC system except for TNos. at which rewriting to the video memory 104 is stopped and TNos. at which an instruction to stop the capstan motor 9 is outputted. Accordingly, description of the flowchart of FIG. 15 is omitted.

A sixth embodiment will be described below.

One feature of digital VTRs is that there is no image deterioration due to dubbing. Another feature is that it is possible to produce a high-quality printout of a reproduced image by utilizing a digital image output terminal of a video printer or the like. Such a digital VTR has various other features, such as image transmission using modems and the inputting of photographic or reproduced images into personal computers.

Although the digital VTR having the aforesaid features is extremely useful, it is occasionally desired to inhibit digital output for the purpose of copyright protection of software tapes.

In the case of audio systems as well, it is similarly desired that the function of preventing copying be realized in a VTR or an audio reproducing apparatus having a digital audio output terminal separately from an analog audio signal output terminal.

According to the sixth embodiment, there is provided a format in which a copy guard signal is defined on a subcode, so that the above-described functions can be achieved without addition of hardware or the like.

For example, if a predetermined bit of a predetermined word in the subcode is "0", dubbing is enabled, while if it is "1", dubbing is inhibited.

Further, bits for specifying whether dubbing is to be inhibited or enabled may be defined for a video signal and an audio signal, respectively.

By defining the bits as the format, it is possible to easily provide a video-camera integrated type of VTR having the function of inhibiting digital copying of an image photographed by the user himself/herself. It is also possible to provide the function of recording a copying inhibiting subcode on a recorded tape at a later time.

Figure 16:
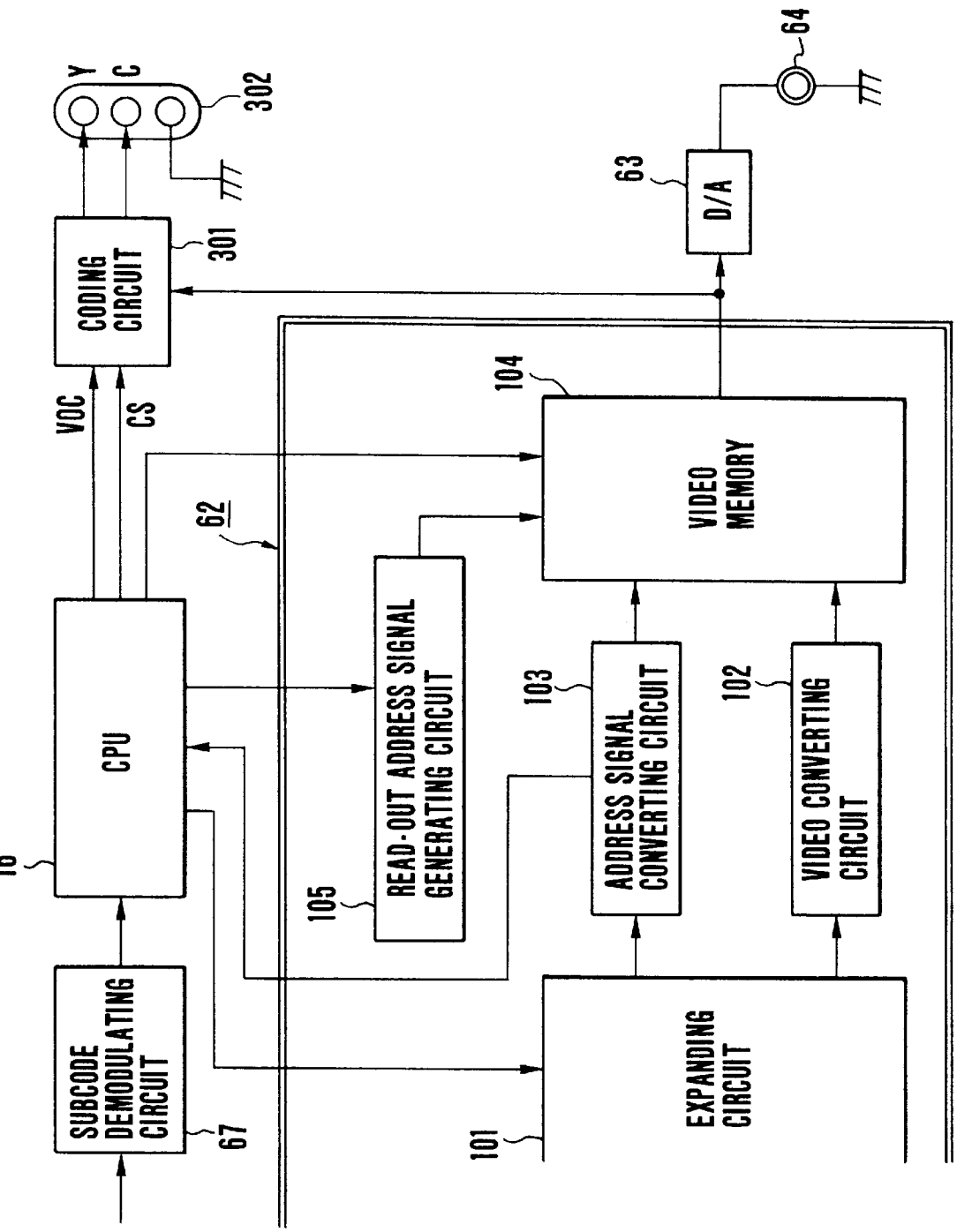
FIG. 16 is a block diagram serving to explain a sixth embodiment and showing the essential portions of the reproducing process circuit provided in the apparatus of FIG. 2.

FIG. 16 is a block diagram showing the essential portions of a control part for inhibiting digital video output in the above-described manner.

The arrangement shown in FIG. 16 includes a coding circuit 301 for converting a digital video signal into a predetermined output format, and a digital video output terminal 302 for outputting, to an outside circuit, digital luminance and chrominance signals outputted from the coding circuit 301.

During reproduction, if the CPU 16 determines from a subcode signal that dubbing is inhibited, the CPU 16 outputs a control signal to the coding circuit 301, thereby stopping the signals from being outputted from the coding circuit 301 to the digital video output terminal 302.

In the meantime, an analog video signal obtained through digital-to-analog conversion performed by the D/A converter 63 is outputted for the purpose of reproduction on a monitor.

Figure 17:
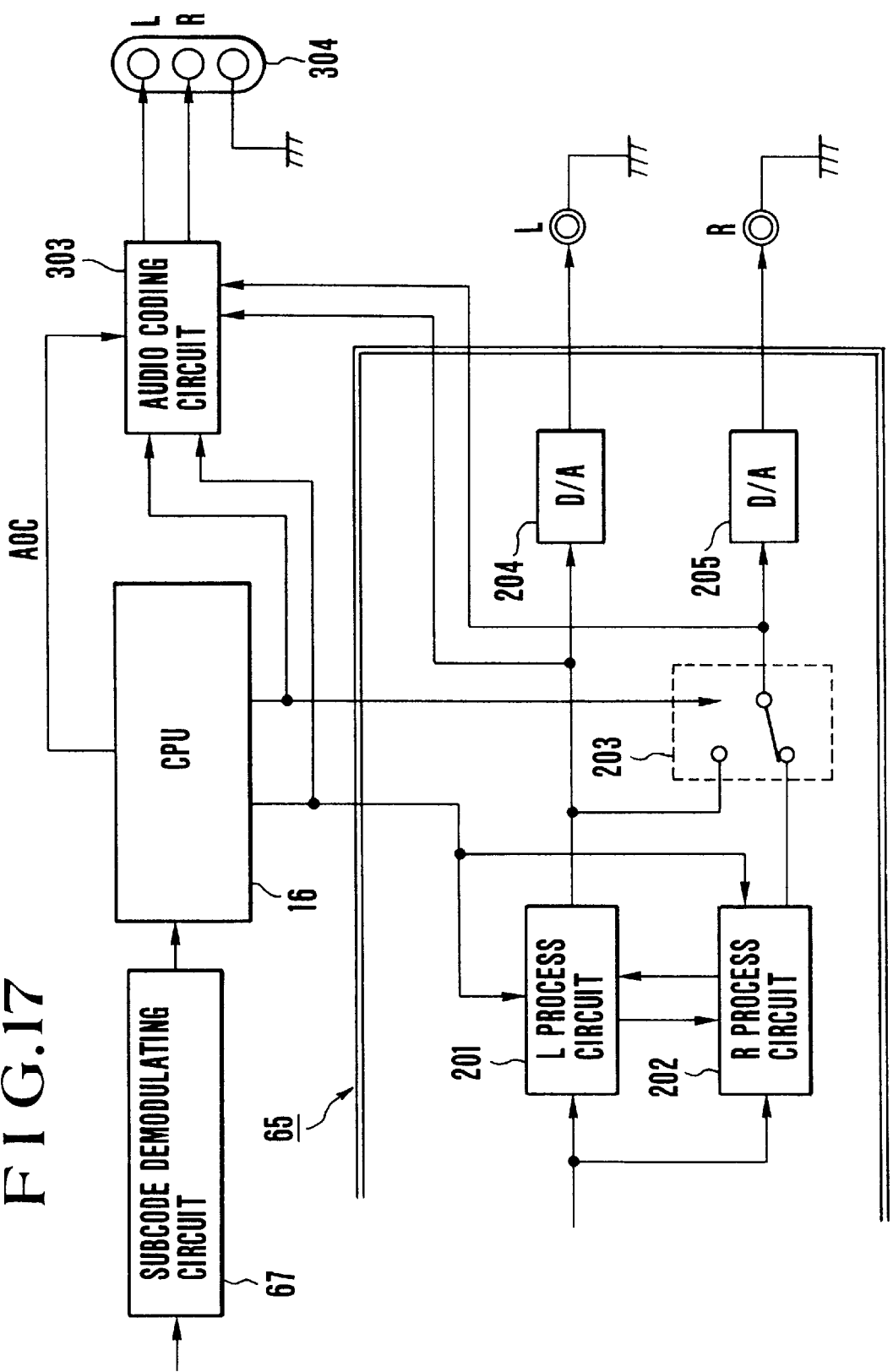
FIG. 17 is a block diagram serving to explain the sixth embodiment and showing the essential portions of the audio reproduction processing circuit provided in the apparatus of FIG. 2.

FIG. 17 is a block diagram showing the essential portions of a control part for inhibiting digital audio output.

The arrangement shown in FIG. 17 includes an audio coding circuit 303 for converting a digital audio signal into a predetermined output format, and a digital audio output terminal 304.

During reproduction, if the CPU 16 determines from a subcode signal that dubbing is inhibited, the CPU 16 outputs a control signal AOC (Audio Output Control) to the audio coding circuit 303, thereby stopping the signal from being outputted from the audio coding circuit 303 to the digital video output terminal 304.

In the meantime, analog audio signals obtained through digital-to-analog conversion performed by the D/A converters 204 and 205 are outputted for the purpose of reproduction.

A seventh embodiment will be described below.

Figure 18:
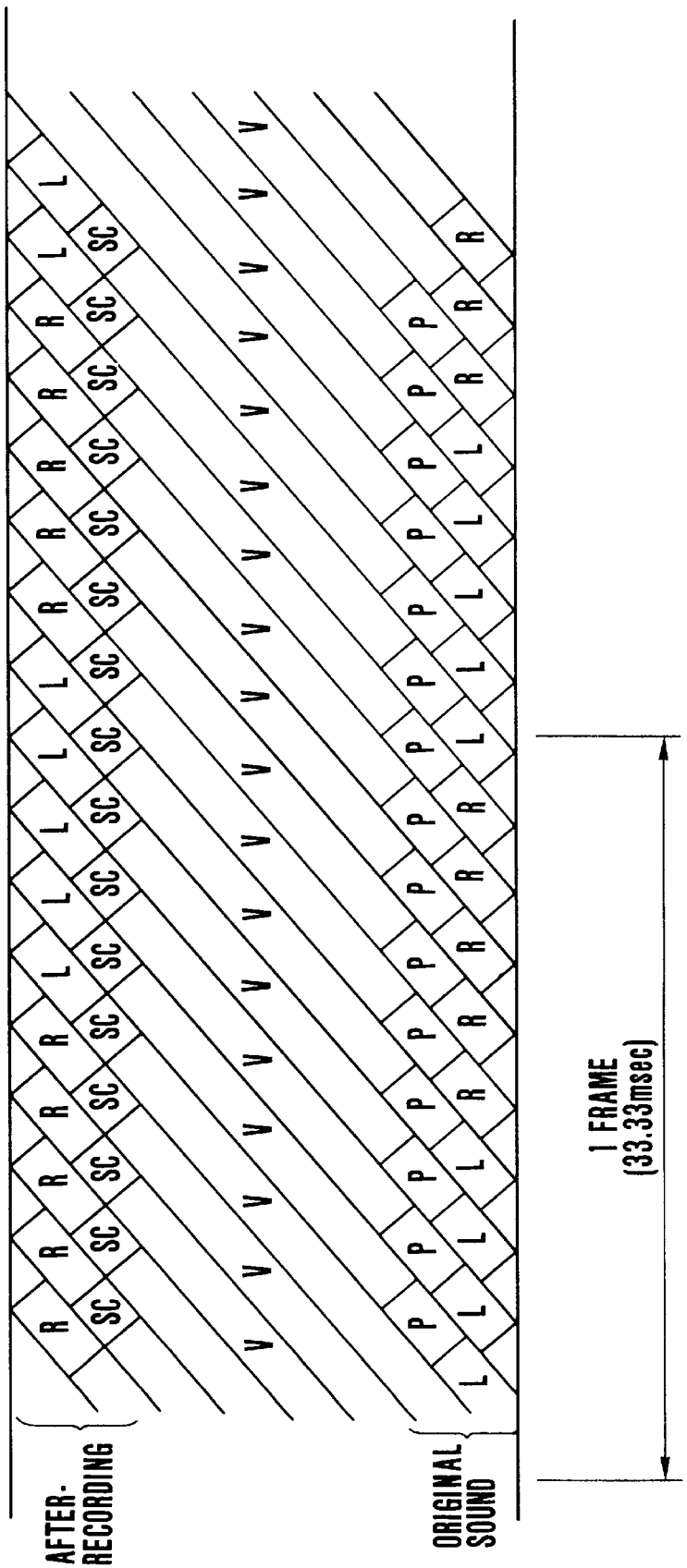
FIG. 18 is a schematic view showing a recording format, which serves to explain a seventh embodiment.
Figure 19A:
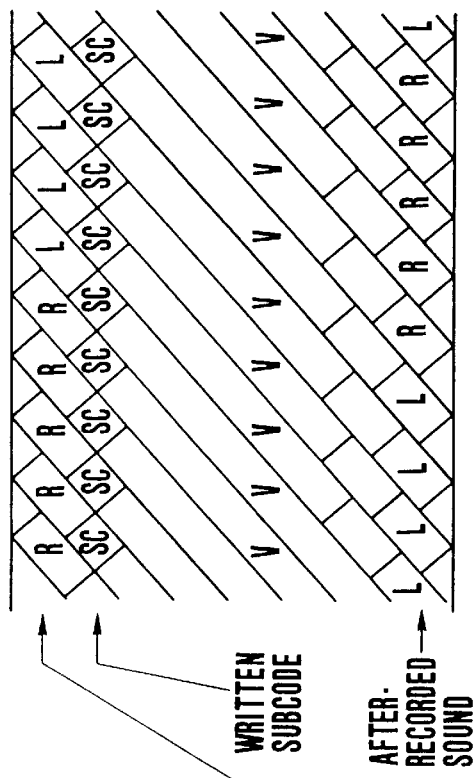
FIG. 19 is a schematic view showing a recording format, which serves to explain the seventh embodiment.
Figure 19B:
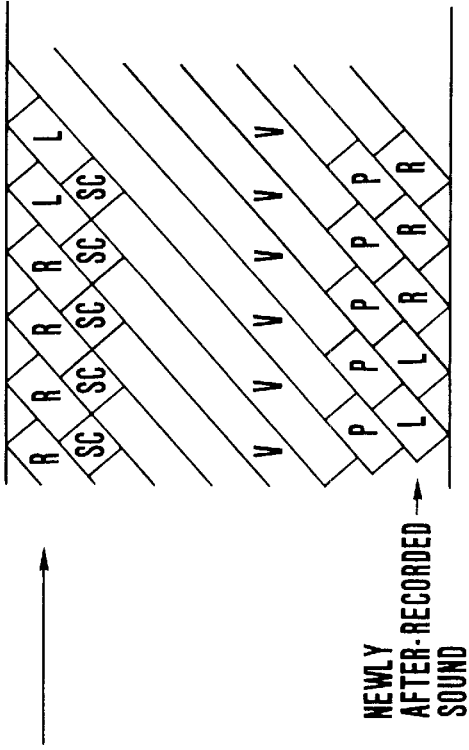
Figure 19C:
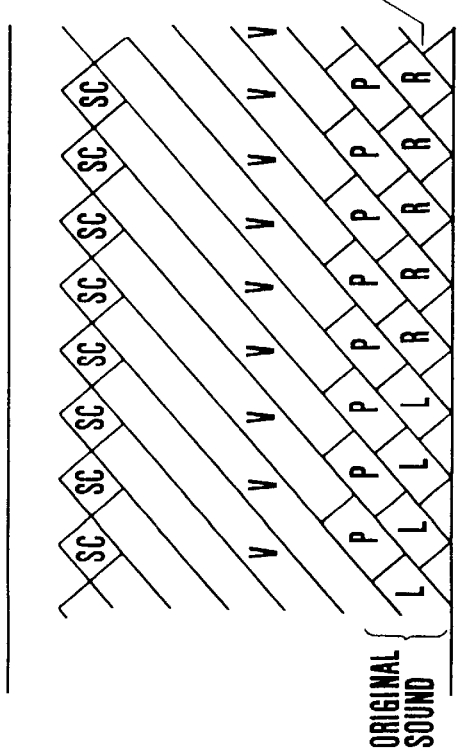
Figure 19D:
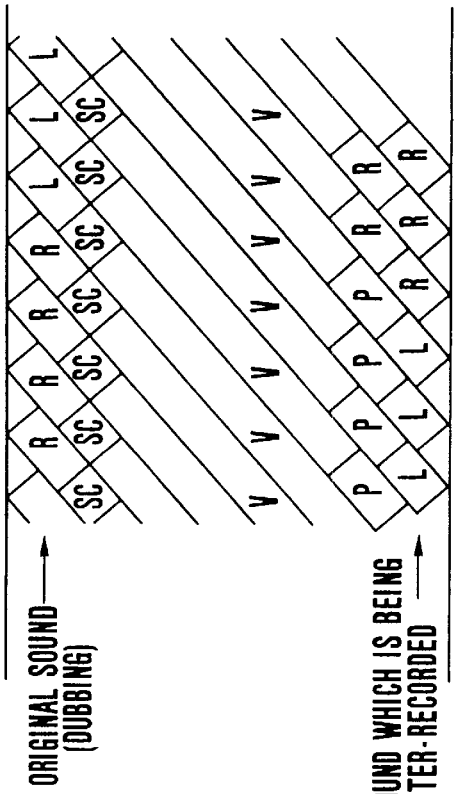

In the seventh embodiment, as illustrated in the tape pattern format view diagrammatically shown in FIG. 18, a dedicated after-recording area is defined in an upper portion of a tape track pattern for the purpose of audio after-recording for again recording only an audio signal on a recorded tape.

An audio after-recording bit is defined as a subcode. For example, "0" is defined as normal video and audio recording, while "1" is defined as audio after-recording. During a reproducing operation, on the basis of the audio after-recording bit of the subcode, it is determined which is to be reproduced, an audio recording (original sound) made in a lower portion of a tape track pattern or an audio recording (after-recorded sound) made in the upper portion thereof.

FIG. 19 shows another definition example of the tape pattern format.

Part (a) of FIG. 19 shows a tape on which an image and a sound are simultaneously recorded, and Part (b) of FIG. 19 shows a tape on which an audio after-recording is made.

As shown in Part (b), in the case of the audio after-recording, the original sound is dubbed to the upper portion of a track and the after-recorded sound is recorded in the lower portion of the track. The audio after-recording bit is rewritten from "0" to "1" and recorded in the subcode area SC.

Parts (c) and (d) of FIG. 19 show a case where an audio after-recording is again made on an after-recorded tape. Referring to Part (c), if it is detected that the audio after-recording bit of the subcode is "1", the original sound (dubbing) recorded in the upper portion of the corresponding track is not altered and the content of the subcode area SC is not rewritten. An after-recorded sound is recorded in the lower portion of the track as shown in Part (d).

As compared to the format shown in FIG. 18, the format shown in FIG. 19 has a merit which enables an after-recorded sound to be reproduced from an audio after-recorded tape if the audio after-recorded tape is reproduced by a digital VTR of the simple type which reproduces no subcode. Although in the above-described example the subcode is set to "1" during audio after-recording, if the original sound is to be reproduced during reproduction, it is also possible to independently change only the subcode from "1" to "0".

Figure 20:
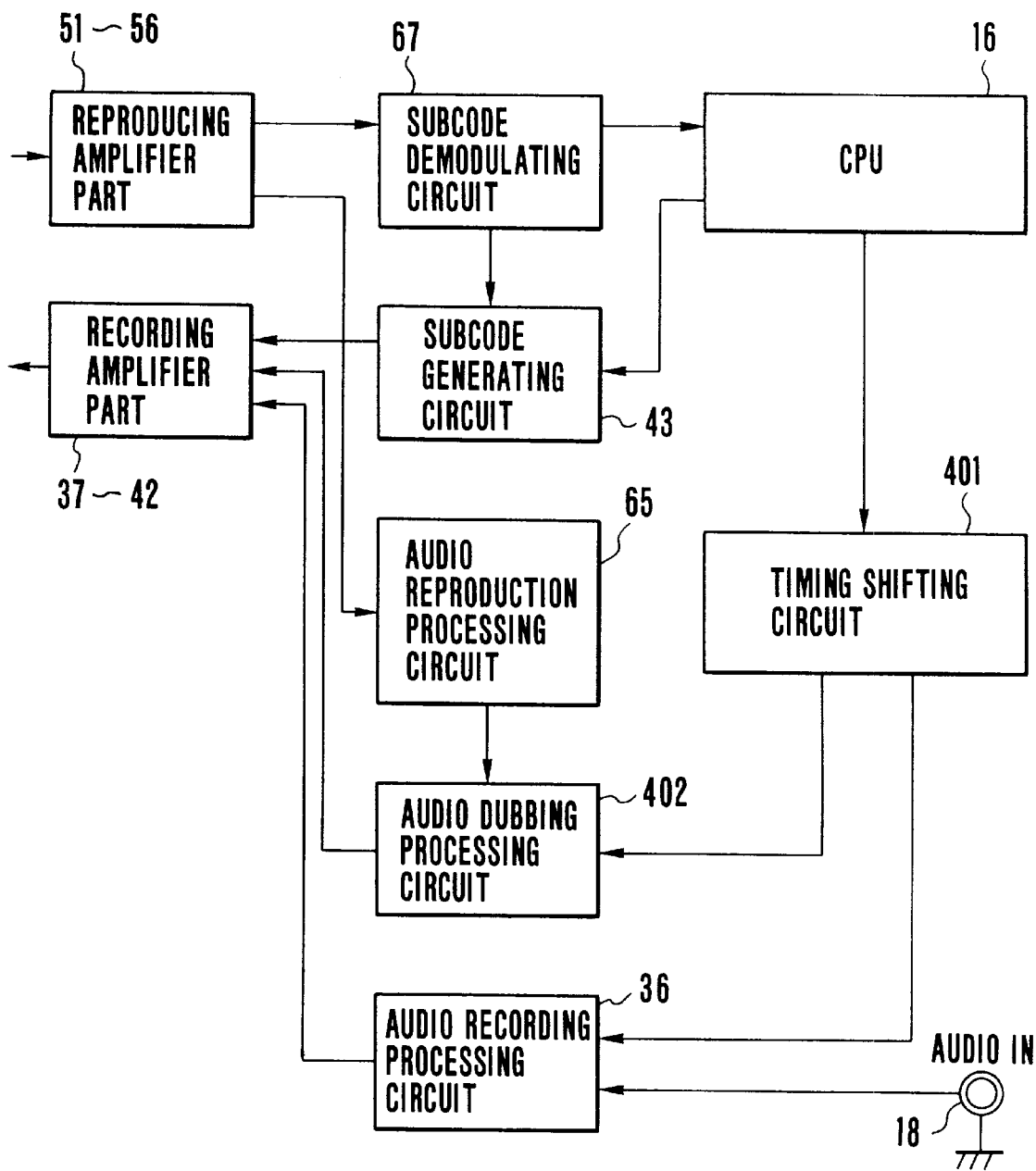
FIG. 20 is a block diagram showing the essential portions of a control part for controlling an after-recording operation according to the seventh embodiment.

FIG. 20 is a block diagram showing the essential portions of a control part for performing the above-described operation. In FIG. 20, the same reference numerals are used to denote parts which are identical to those shown in FIGS. 1 and 2.

In FIG. 20, a recording amplifier part represents a group of the blocks 37 to 42 shown in FIG. 1, and a reproducing amplifier part represents a group of the blocks 59 to 64 shown in FIG. 2.

A timing shifting circuit 401 is provided for shifting, from the lower side to the upper side of the tape, the recording position on a tape of a digital audio signal obtained by converting an audio signal inputted during audio after-recording into digital data.

A dubbing processing circuit 402 is provided for dubbing the digital audio signal of a reproduced original sound to a predetermined area on a track in accordance with a timing signal outputted from the timing shifting circuit 401.

A reproduced subcode is again recorded after its audio after-recording bit has been set to "1" by the CPU 16.

In the case of an after-recorded tape, "1" is reproduced and no bit change is performed.

In the seventh embodiment, it is also desirable that a subcode indicative of the date on which after-recording is performed be defined on the format since the recording of the date is convenient for later editing and filing.

An eighth embodiment will be described below.

To prevent erroneous erasure of an important recorded tape, various methods have conventionally been proposed and practiced, such as a method of breaking a safety lug (VHS video cassette) and a method of sliding a shutter (8 mm video cassette). All of the methods are intended to prevent erroneous erasure in the unit of one video cassette tape.

However, actually, important recorded portions and unimportant recorded or unrecorded portions are commonly contained in one video cassette tape.

Accordingly, if the conventional method is combined with a method of recording an erasure preventing signal in an important recorded portion of a tape, it is possible to prevent a user from erroneously making a re-recording on the important recorded portion of the tape during editing, such as audio after-recording or the processing of recording another video signal or a title picture on an unrecorded portion.

In the eighth embodiment, a predetermined bit of a subcode is set to "0" indicative of "erasure enabled" or "1" indicative of "erasure inhibited", so that inhibition of the above-described partial re-recording is realized.

Further, to improve operability, it is preferable to specify the kind of erasable, recorded information, for example, in such a manner that erasure of both video and audio information is inhibited ("11"), erasure of only video information is inhibited ("10") and erasure of only audio information is inhibited ("01").

A ninth embodiment will be described below.

Figure 21:
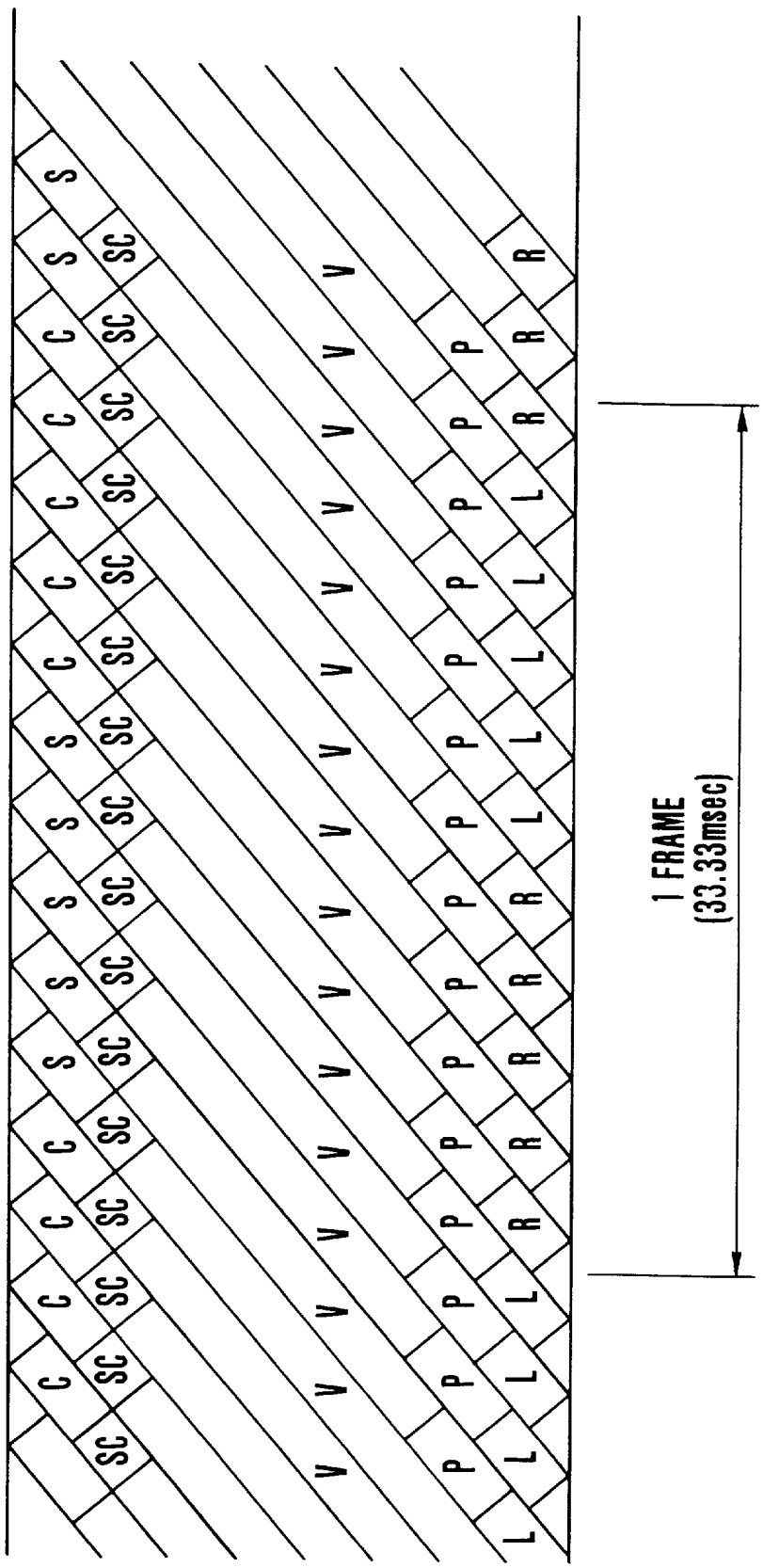
FIG. 21 is a schematic view showing a recording format, which serves to explain a ninth embodiment.

FIG. 21 schematically shows a track format in which 4-channel audio recording is possible (Left, Right, Center, Surround) when the HD mode is selected.

A subcode bit is defined as "01" for 2-channel recording or "1" for 4-channel recording.

To discriminate between the audio patterns shown in FIGS. 18 and 21 during reproduction, there is also a method of defining an ID code in each digital data and utilizing a signal obtained by detecting the ID code. However, if 2-channel/4-channel after-recording or the like is taken into account, it is preferable to define the subcode bit in that hardware and software design can be facilitated.

Although the foregoing description has referred to various kinds of subcode information, a format example of the subcode information described hereinabove is shown in Table 2.

In Table 2, "8-BIT DATA" indicates the 8-bit data of each of the words WD0 to WD7. Bits corresponding to empty lines or "**" marked lines may be either "0" or "1" or may be defined as either one of "0" or "1", or may be used for other purposes.

Each bit to which "0" or "1" is assigned has a meaning which corresponds to the content shown in the column "CONTENT".

Also, "n" constitutes the first 4 bits or the second 4 bits of the 8-bit data and indicates that an integer n of 0–9 is represented by 4-bit binary data.

The part "linear time counter" shown in the column "CONTENT" shows the values of a linear time counter which serves as a tape counter during recording.

The part "recording date" shows the date on which recording was made.

In the format, BL0–BL3 may be recorded on all tracks, or may be separately recorded on a plurality of tracks in such a manner that BL0 and BL1 are recorded on even-numbered tracks and BL2 and BL3 are recorded on odd-numbered tracks.

TABLE 2

| BLOCK | WORD | 8-BIT DATA | | CONTENT | |
|---|---|---|---|---|---|
| BL0 | WD0 | "n" | "n" | 10 hours, 1 hour | linear |
|  | WD1 | ↓ | ↓ | 10 minutes, 1 minute | time |
|  | WD2 | ↓ | ↓ | 10 seconds, 1 second | counter |
|  | WD3 | ↓ | ↓ | 10 frames, 1 frame |  |
| BL1 | WD0 | ↓ | ↓ | Year, Month | recording |
|  | WD1 | ↓ | ↓ | 10th day, 1st day | date |
|  | WD2 | ↓ | ↓ | 10 o'clock, 1 o'clock |  |
|  | WD3 | ↓ | ↓ | 10 minutes, 1 minute |  |
|  | WD4 | ↓ | ↓ | 10 seconds, 1 second |  |
| BL2 | WD0 | 0 | 01 | NTSC, HDTV | broadcasting |
|  |  | 0 | 00 | NTSC, HP | system |
|  |  | 1 | 01 | PAL, HDTV |  |
|  |  | 1 | 00 | PAL, HP |  |
|  | WD1 |  | 00 | SP | tape |
|  |  |  | 01 | LP | speed |
|  |  |  | 10 | HP |  |
|  |  |  | 11 | Unrecorded |  |
|  | WD2 | "n" | "n" | 10th, 1st | track number |
|  | WD3 | 0 | 11 | 2ch, stereophonic | audio |
|  |  | 0 | 10 | 2ch, bilingual | channel |
|  |  | 0 | 01 | 2ch, monaural | mode |
|  |  | 1 | ** | 4ch |  |
| BL3 | WD0 | 0 | ** | dubbing OK |  |
|  |  |  | 11 | dubbing inhibited:Video & Audio |  |
|  |  |  | 10 | dubbing inhibited:only Video |  |
|  |  |  | 10 | dubbing inhibited:only Audio |  |
|  | WD1 |  | 0 | audio after-recording:not made |  |
|  |  |  | 1 | audio after-recording:made |  |
|  | WD2 | "n" | "n" | year, month | date of audio |
|  | WD3 | "n" | "n" | 10th day, 1st day | after-recording |
|  | WD4 | 0 | ** | erasure OK |  |
|  |  | 1 | 11 | erasure inhibited:Video & Audio |  |
|  |  | 1 | 10 | erasure inhibited:only Video |  |
|  |  | 1 | 01 | erasure inhibited:only Audio |  |

As is apparent from the foregoing description, in accordance with the present invention, an area in which to record sub-information related to video information, such as information on a television system, is provided on a track on which to record the video information, so that the sub-information can be recorded and reproduced by a head for recording and reproducing the video information. Accordingly, it is possible to easily detect sub-information related to recorded video information and audio information and to improve the operability of the apparatus, and it is also possible to reduce the whole size and the price of the apparatus.

What is claimed is:

1. A digital signal recording apparatus for recording a digital video signal and a digital audio signal on a recording medium transported by transporting means, comprising:

(a) sub-information generating means for generating digital sub-information including a first signal indicating at least one of the different types of television signal formats of the digital video signal and a second signal representing at least one of a plurality of recording mode each of which has different transporting speed of the recording medium; and (b) recording means for forming a plurality of tracks on a recording medium transported by said transporting means to record the digital video signal and the digital sub-information in each of the plurality of tracks, said recording means recording adjacently the first signal and the second signal in each of the plurality of tracks.

2. An apparatus according to claim 1, wherein said sub-information generating means generates digital sub-information related to the digital audio signal.

3. An apparatus according to claim 2, wherein the television signal formats include a high-definition format and a standard format.

4. An apparatus according to claim 3, wherein said recording means further records the digital audio signal on the recording medium, and
   wherein said recording means records, if said recording means is to record another digital audio signal by after-recording on the recording medium on which said digital audio signal is recorded, said digital audio signal recorded before the after-recording and the another digital audio signal recorded by the after-recording at different locations on a single track on the recording medium.

5. An apparatus according to claim 4, further comprising reproducing means for reproducing the digital video signal and a digital audio signal from the recording medium, the digital sub-information including a signal indicating which is to be reproduced by said reproducing means, the digital audio signal recorded before the after-recording or the digital audio signal recorded by the after-recording.

6. An apparatus according to claim 2, wherein said digital sub-information includes a signal indicative of a mode of the digital audio signal, the mode of the digital audio signal including a monaural mode, a stereophonic mode and a bilingual mode.

7. An apparatus according to claim 2, wherein said digital sub-information includes a signal indicative of the number of channels of the digital audio signal.

8. An apparatus according to claim 1, wherein said digital sub-information includes a signal indicative of a recording mode of the digital video signal, the recording mode including a long-time mode and a standard-time mode.

9. An apparatus according to claim 1, wherein the digital sub-information includes a signal indicating whether copying of each of the digital video signal and the digital audio signal is enabled.

10. An apparatus according to claim 1, wherein the digital sub-information includes a signal indicative of inhibition of erasure of the digital video signal.

11. An apparatus according to claim 1, wherein said recording means includes a rotary head.

12. An apparatus according to claim 1, further comprising:
   compressing means for compressing the amount of data of the digital video signal,
   the digital sub-information including a signal indicative of a compression ratio of said compressing means.

13. A digital signal recording apparatus for recording a digital video signal and a digital audio signal on a tape-shaped recording medium transported by transporting means, comprising:
   sub-information generating means for generating digital sub-information including a first signal representing at least one of the different types of television signal formats of the digital video signal and a second signal representing at least one of a plurality of recording modes each of which has different transporting speed of the tape-shaped recording medium; and
   recording means for forming a plurality of helical tracks on a tape-shaped recording medium transported by said transporting means to record the digital video signal and the digital sub-information signal in each of the plurality of helical tracks,
   said recording means recording adjacently the first signal and the second signal in each of the plurality of helical tracks.

14. An apparatus according to claim 13, wherein each of the different types of television signal formats has different number of frames per unit time.

15. An apparatus according to claim 13, wherein said recording means comprising compressing means for compressing an information amount of the digital video signal.

16. An apparatus according to claim 13, wherein said recording means comprising a rotary head for recording the digital video signal and the digital sub-information signal.

* * * * *

UNITED STATES PATENT AND TRADEMARK OFFICE
CERTIFICATE OF CORRECTION

PATENT NO. : 5,966,496
DATED : October 12, 1999
INVENTOR(S) : Hiroyuki Takimoto

It is certified that error appears in the above-indentified patent and that said Letters Patent is hereby corrected as shown below:

Col. 6, line 28, delete "VTRS" and insert -- VTRs --.
Col. 17, line 56, delete "10" and insert -- 01 --.
Col. 17, lines 58 and 59, to the right of "date of audio" and "after-recording" insert a -- } --.

Signed and Sealed this

Seventeenth Day of April, 2001

Attest:

NICHOLAS P. GODICI

Attesting Officer   Acting Director of the United States Patent and Trademark Office